US011409988B2

(12) United States Patent
Katoh et al.

(10) Patent No.: US 11,409,988 B2
(45) Date of Patent: Aug. 9, 2022

(54) METHOD, RECORDING MEDIUM, AND DEVICE FOR UTILIZING FEATURE QUANTITIES OF AUGMENTED TRAINING DATA

(71) Applicant: FUJITSU LIMITED, Kawasaki (JP)

(72) Inventors: Takashi Katoh, Kawasaki (JP); Kento Uemura, Kawasaki (JP); Suguru Yasutomi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 158 days.

(21) Appl. No.: 16/736,911

(22) Filed: Jan. 8, 2020

(65) Prior Publication Data

US 2020/0234081 A1  Jul. 23, 2020

(30) Foreign Application Priority Data

Jan. 17, 2019 (JP) .............................. JP2019-006321

(51) Int. Cl.
 *G06K 9/62* (2022.01)
(52) U.S. Cl.
 CPC ......... *G06K 9/6256* (2013.01); *G06K 9/6229* (2013.01); *G06K 9/6255* (2013.01)
(58) Field of Classification Search
None
See application file for complete search history.

(56) References Cited

U.S. PATENT DOCUMENTS

| 10,803,357 | B2 * | 10/2020 | Yasutomi | ............. G06K 9/6259 |
|---|---|---|---|---|
| 10,891,516 | B2 * | 1/2021 | Endoh | .................. G06K 9/6262 |
| 11,100,678 | B2 * | 8/2021 | Yasutomi | ................ G06T 9/002 |
| 2018/0144214 | A1 * | 5/2018 | Hsieh | ..................... G06K 9/036 |
| 2018/0157934 | A1 * | 6/2018 | Hu | ......................... G06N 3/084 |
| 2018/0260793 | A1 * | 9/2018 | Li | ........................... G06T 7/001 |

FOREIGN PATENT DOCUMENTS

GB          2560219       9/2018

OTHER PUBLICATIONS

EESR—The Extended European Search Report dated Jun. 16, 2020 for European Patent Application No. 20151398.3.
Utako Yamamoto, et al.,"Deformation estimation of an elastic object by partial observation using a neural network", Nov. 28, 2017.
Tolga Tasdizen, et al.,"Appearance invariance in convolutional networks with neighborhood similarity", Jul. 3, 2017.

(Continued)

*Primary Examiner* — Tahmina N Ansari
(74) *Attorney, Agent, or Firm* — Fujitsu Patent Center

(57) ABSTRACT

A learning device learns at last one parameter of a learning model such that each intermediate feature quantity becomes similar to a reference feature quantity, the each intermediate feature quantity being calculated as a result of inputting a plurality of sets of augmentation training data to a first neural network in the learning model, the plurality of augmentation training data being generated by performing data augmentation based on same first original training data. The learning device learns at last one parameter of a second network, in the learning model, using second original training data, which is different than the first original training data, and using the reference feature quantity.

12 Claims, 17 Drawing Sheets

(56) References Cited

OTHER PUBLICATIONS

Grigorios G. Chrysos, et al.,"Visual Data Augmentation through Learning", Jan. 20, 2018.
Baruch Epstein, et al., "Joint auto-encoders: a flexible multi-task learning framework", May 30, 2017.
Weihua Hu, et al.,"Learning Discrete Representations via Information Maximizing Self-Augmented Training", Jun. 14, 2017.
Matthias Meyer, et al.,"Unsupervised Feature Learning for Audio Analysis", Workshop track—ICLR 2017, Dec. 11, 2017.
Xinyue Zhu, et al.,"Emotion Classification with Data Augmentation Using Generative Adversarial Networks", Dec. 14, 2017.
Yu Su, et al.,"Cross-domain Semantic Parsing via Paraphrasing", Jul. 24, 2017.

* cited by examiner

FIG.6

| DATA NUMBER | TRAINING DATA | CORRECT LABEL |
|---|---|---|
| p001 | xP1 | yP1 |
| p002 | xP2 | yP2 |
| p003 | xP3 | yP3 |
| ... | ... | ... |

FIG.7

| DATA NUMBER | DATA-AUGMENTED TRAINING DATA | CORRECT LABEL |
|---|---|---|
| p001 | xP1.1, xP1.2, xP1.3 | yP1 |
| p002 | xP2.1, xP2.2, xP2.3 | yP2 |
| p003 | xP3.1, xP3.2, xP3.3 | yP3 |
| ... | ... | ... |

FIG.8

| IDENTIFICATION INFORMATION | PARAMETER |
|---|---|
| FIRST NN | $\theta 1$ |
| SECOND NN | $\theta 2$ |

FIG.9

| DATA NUMBER | REFERENCE FEATURE QUANTITY | CORRECT LABEL |
|---|---|---|
| p001 | zP1 | yP1 |
| p002 | zP2 | yP2 |
| p003 | zP3 | yP3 |
| ... | ... | ... |

| DATA NUMBER | INTERMEDIATE FEATURE QUANTITY | CORRECT LABEL |
|---|---|---|
| q001 | zQ1 | yQ1 |
| q002 | zQ2 | yQ2 |
| q003 | zQ3 | yQ3 |
| ... | ... | ... |

145

METHOD, RECORDING MEDIUM, AND DEVICE FOR UTILIZING FEATURE QUANTITIES OF AUGMENTED TRAINING DATA

CROSS-REFERENCE TO RELATED APPLICATION(S)

This application is based upon and claims the benefit of priority of the prior Japanese Patent Application No. 2019-006321, filed on Jan. 17, 2019, the entire contents of which are incorporated herein by reference.

FIELD

The embodiments discussed herein are related to a learning method.

BACKGROUND

In the case of learning a deep learning model, the volume of training data (learning data) is a factor that significantly contributes to the performance, and thus it is desirable to have as large volume of the training data as possible. If the training data becomes insufficient and if applied data of a type not available in the training data is applied to the deep learning model that was learnt using the training data, then it is highly likely that an appropriate output result is not obtained and the learning ends up in failure.

In a business situation in which customer data is used, in view of the risk of divulging of the contract agreement or the information, it is difficult to indefinitely hold on particular customer data or to share it in other customer tasks. Hence, there are times when the training data becomes insufficient.

When the training data becomes insufficient, it is common practice to perform data augmentation. The data augmentation includes processing such as noise addition, parallel translation, and data missing; and the range of the training data can be expanded to the range of the applied data.

A conventional technology is known in which intermediate feature quantities that are obtained as a result of inputting the original training data to a deep learning model are held, so that the available volume of data at the time of newly learning the deep learning model is increased without having to hold on to the original training data.

FIG. 18 is a diagram for explaining the conventional technology. With reference to FIG. 18, a deep learning model 10 includes a first neural network (NN) 10a and a second neural network (NN) 10b. When training data is input thereto, the first NN 10a calculates intermediate feature quantities. When the intermediate feature quantities are input thereto, the second NN 10b calculates output labels. It is assumed that the parameter of the first NN 10a and the second NN 10b is already learnt using a plurality of sets of training data of a customer P as stored in a database 10P. When the learning is over, the information in the database 10P is returned to the customer P (or is destroyed).

For example, when training data xP1 is input to the first NN 10a, an intermediate feature quantity zP1 gets calculated. When the intermediate feature quantity zP1 is input to the second NN 10b, an output label yP1' gets calculated. In the conventional technology, before the information in the database 10P is returned, the intermediate feature quantity zP1 that is calculated from the training data xP1 is stored in a database 13. Moreover in the conventional technology, the intermediate feature quantities that are calculated from the other sets of training data stored in the database 10P are also stored in the database 13.

Subsequently, in the conventional technology, a new deep learning model 11 is learnt (sequentially learnt) using a database 11Q, in which a plurality of sets of training data of a customer Q is stored, and using the database 13. The deep learning model 11 includes a first NN 11a and a second NN 11b. In the conventional technology, the already-learnt parameter of the first NN 10a is set as the parameter of the first NN 11a. Similarly, the already-learnt parameter of the second NN 10b is set as the parameter of the second NN 11b.

For example, when training data xQ1 in the database 11Q is input to the first NN 11a, an intermediate feature quantity zQ1 gets calculated. When the intermediate feature quantity zQ1 is input to the second NN 11b, an output label yQ1' gets calculated. In the conventional technology, the parameter of the second NN 11b is learnt in order to ensure that the output label yQ1' approaches the correct label (not illustrated).

Moreover, when the intermediate feature quantity zP1 is input to the second NN 11b from the database 13, an output label yP1' gets calculated. In the conventional technology, the parameter of the second NN 11b is learnt in order to ensure that the output level yP1' approaches the correct label (not illustrated).

As described above, in the conventional technology, in the case of learning the parameter of the second NN 11b, the learning is performed using the intermediate feature quantities calculated from the training data stored in the database 11Q as well as using the intermediate feature quantities stored in the database 13. For that reason, even if the database 10P is returned to the customer P (or is destroyed), it becomes possible to increase the available volume of data at the time of learning a new deep learning model.

[Non-patent Literature 1] Utako Yamamoto et al. "Deformation estimation of an elastic object by partial observation using a neural network"

In the case in which a deep learning model is learnt using the conventional technology explained with reference to FIG. 18, if all intermediate feature quantities that are calculated from a plurality of sets of data-augmented training data are stored, then the volume of stored data becomes large.

FIGS. 19 and 20 are diagrams for explaining the issues faced in the conventional technology. The following explanation is given with reference to FIG. 19. In the conventional technology, as a result, of performing data augmentation with respect to the original training data xP1 stored in the database 10P, sets of training data xP1.1, xP1.2, and xP1.3 are generated. In the conventional technology, when the sets of training data xP1.1, xP1.2, and xP1.3 are separately input to the first NN 10a, intermediate feature quantities zP1.1, zP1.2, and zP1.3 get respectively calculated. Then, in the conventional technology, when the intermediate feature quantities zP1.1, zP1.2, and zP1.3 are separately input to the second NN 10b, output labels yP1.1', yP1.2', and yP1.3' get respectively calculated.

In the conventional technology, the intermediate feature quantities zP1.1, zP1.2, and zP1.3 are stored in the database 13. Herein, if data augmentation is performed with respect to each set of original training data stored in the database 10P, then all intermediate feature quantities of each set of data-augmented training data get stored in the database 13, thereby resulting in an increase in the volume of data.

Generally, in the case of learning a deep learning model, it is preferable to have as large volume of training data as possible. However, if the distribution of the intermediate feature quantities of the training data obtained by data augmentation of particular original training data is not separated from the distribution of the intermediate feature quantities of the training data obtained by data augmentation of some other original training data; then, even if those intermediate feature quantities are used, the output labels obtained by inputting the intermediate feature quantities to the second NN 10b are not appropriately separated thereby possibly leading to a decline in the learning accuracy. Hence, it is not always the case that data augmentation is performed to store as large volume of training data as possible in the database 13.

The following explanation is given with reference to FIG. 20. In order to reduce the volume of data stored in the database 13, it is possible to think of simply reducing the intermediate feature quantities. In the example illustrated in FIG. 20, from among the intermediate feature quantities zP1.1, zP1.2, and zP1.3, the intermediate feature quantities zP1.1 and zP1.2 are omitted. However, if the intermediate feature quantities are reduced according to this method, the effects of data augmentation is achieved and the learning accuracy of the deep learning model undergoes a decline. That is, even if the training data xQ1 is subjected to data augmentation to generate data-augmented training data xQ1.1, xQ1.2, and xQ1.3; it is not possible to continually make use of the effects achieved as a result of performing data augmentation with respect to the training data xP1 using the deep learning model 10. Meanwhile, when the sets of post-augmentation training data xQ1.1, xQ1.2, and xQ1.3 are input to the first NN 11a, intermediate feature quantities zQ1.1, zQ1.2, and zQ1.3 get respectively calculated. When the intermediate feature quantities zQ1.1, zQ1.2, and zQ1.3 are input to the second NN 11b, output labels yQ1.1', yQ1.2', and yQ1.3' get respectively calculated.

SUMMARY

According to an aspect of an embodiment, a learning method, executed by a computer, includes: first learning at last one parameter of a learning model such that each intermediate feature quantity becomes similar to a reference feature quantity, the each intermediate feature quantity being calculated as a result of inputting a plurality of sets of augmentation training data to a first neural network in the learning model, the plurality of augmentation training data being generated by performing data augmentation based on same first original training data; and second learning at last one parameter of a second network, in the learning model, using second original training data, which is different than the first original training data, and using the reference feature quantity.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an exemplary data structure of a learning database according to the first embodiment;

FIG. 7 is a diagram illustrating an exemplary data structure of an augmentation training data table according to the first embodiment;

FIG. 8 is a diagram illustrating an exemplary data structure of a parameter table according to the first embodiment;

FIG. 9 is a diagram illustrating an exemplary data structure of a reference feature quantity database according to the first embodiment;

DESCRIPTION OF EMBODIMENTS

Preferred embodiments of the present invention will be explained with reference to accompanying drawings. However, the present invention is not limited by those embodiments.

[a] First Embodiment

Figure 1:
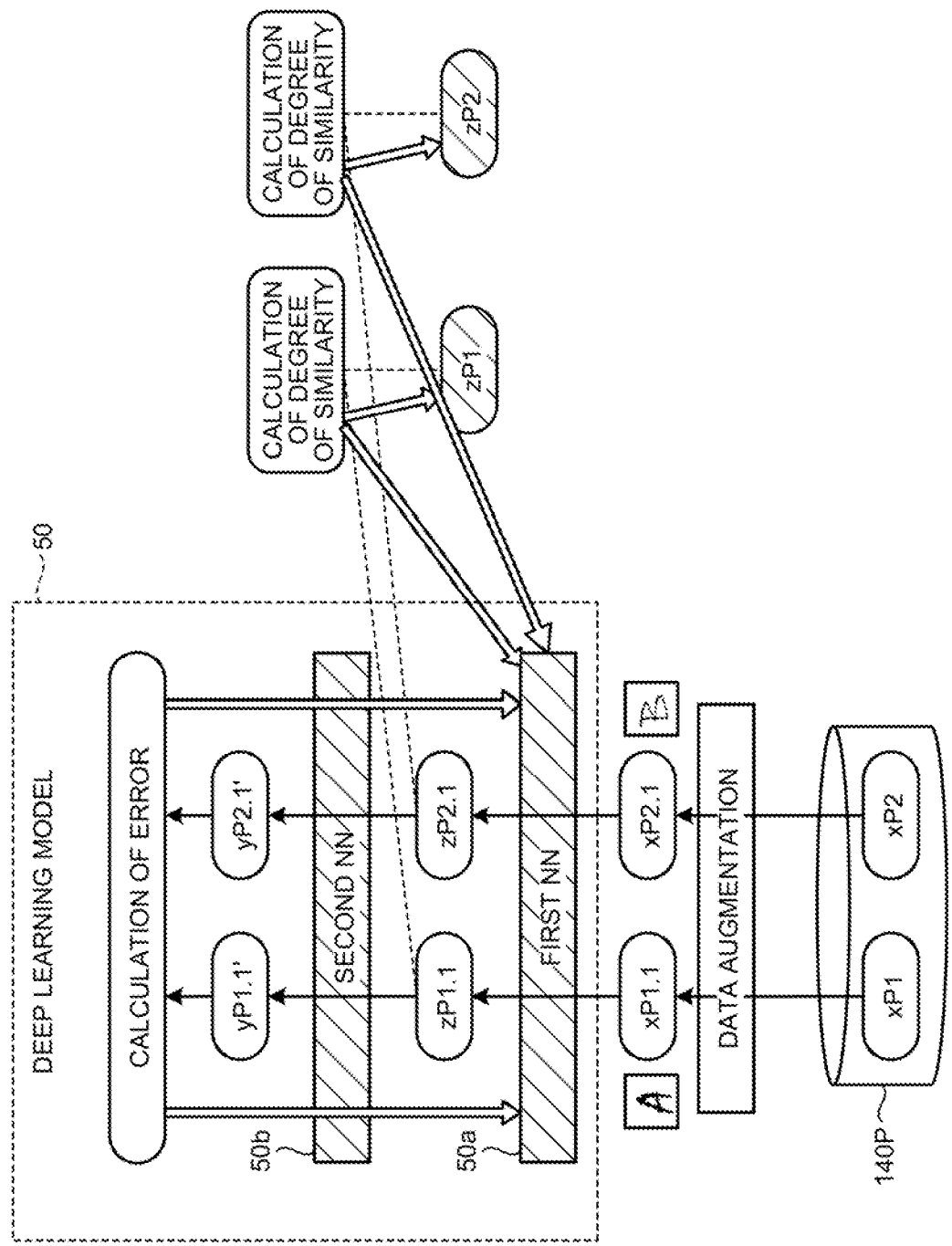
FIG. 1 is a diagram (1) for explaining the operations performed in a learning device according to a first embodiment.

FIGS. 1 to 4 are diagrams for explaining the operations performed in a learning device according to a first embodiment. The following explanation is given with reference to FIG. 1. With reference to FIG. 1, a deep learning model 50 includes a first NN 50a and a second NN 50b. The first NN 50a is a neural network that, when a set of training data is input thereto, calculates an intermediate feature quantity. The second NN 50b is a neural network that, when an intermediate feature quantity is input thereto, calculates an output label. A database 140P is used to store original training data of the customer P. For example, the database 140P is used to store sets of training data xP1 and xP2. Moreover, the database 140P can also be used to store other training data.

The learning device performs data augmentation with respect to the sets of training data xP1 and xP2, and generates sets of training data xP1.1 and xP2.1, respectively. Then, the learning device inputs the training data xP1.1 to the first NN 50a, and calculates an intermediate feature quantity zP1.1. Similarly, the learning device inputs the training data xP2.1 to the first NN 50a, and calculates an intermediate feature quantity zP2.1.

Subsequently, the learning device inputs the intermediate feature quantity zP1.1 to the second NN 50b, and calculates an output label yP1.1'. Similarly, the learning device inputs the intermediate feature quantity zP2.1 to the second NN 50b, and calculates an output label yP2.1'.

Then, the learning device calculates the error between the output label yP1.1' and the correct label (not illustrated) of the training data xP1. Moreover, the learning device calculates the error between the output label yP2.1' and the correct label (not illustrated) of the training data xP2. Subsequently, the learning device implements the backpropagation method and learns the parameter of the first NN 50a and the parameter of the second NN 50b in order to ensure that the errors become smaller.

Moreover, the learning device calculates the degree of similarity between the intermediate feature quantity zP1.1 and a reference feature quantity zP1 of the training data xP1. Similarly, the learning device calculates the degree of similarity between the intermediate feature quantity zP2.1 and a reference feature quantity zP2 of the training data xP2. Then, the learning device implements the backpropagation method and learns the parameter of the first NN 50a and the reference feature quantities zP1 and zP2 in order to ensure that the degrees of similarity become higher.

Figure 2:
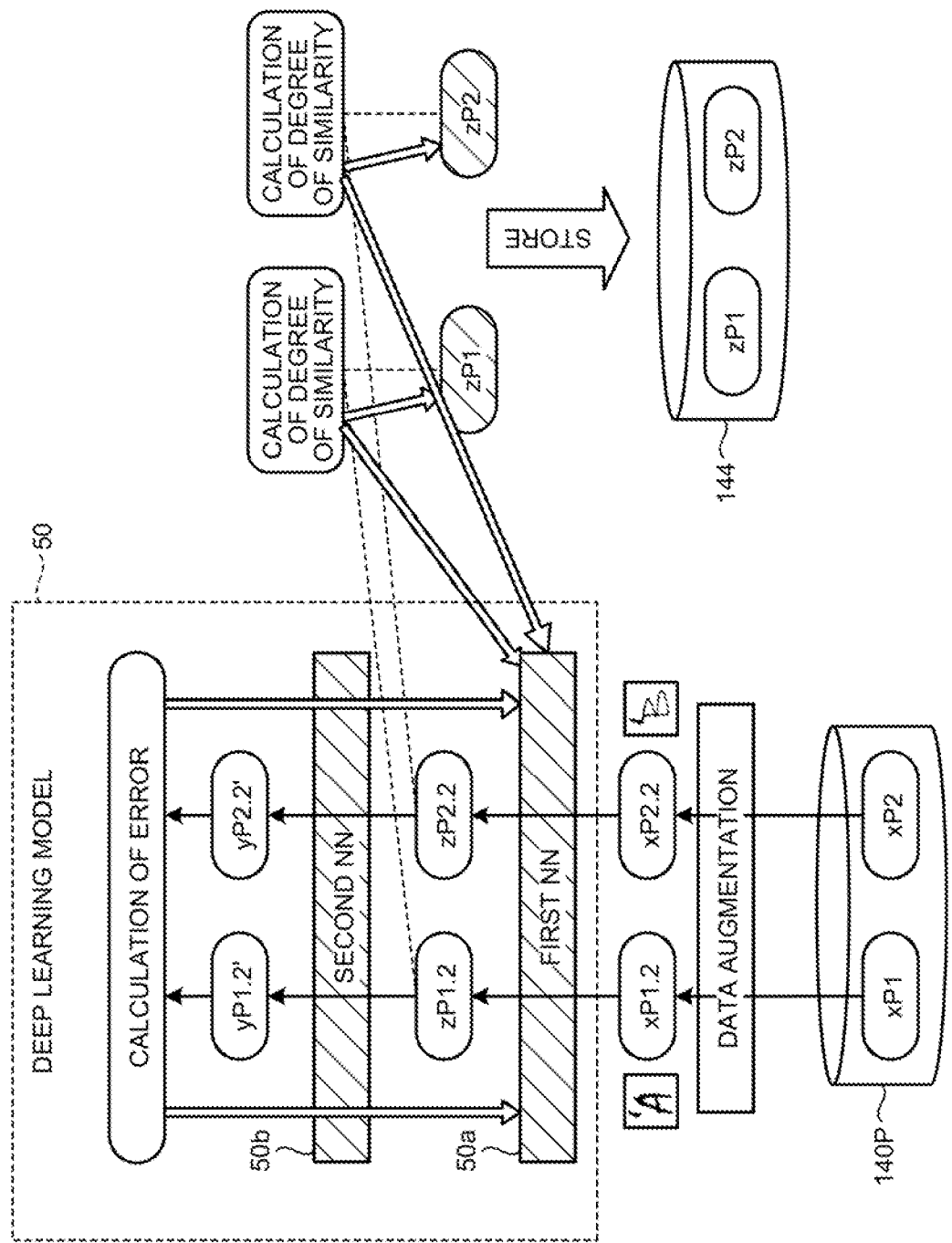
FIG. 2 is a diagram (2) for explaining the operations performed in the learning device according to the first embodiment.

The following explanation is given with reference to FIG. 2. The learning device performs data augmentation with respect to the sets of training data xP1 and xP2 and generates the sets of training data xP1.2 and xP2.2, respectively. Then, the learning data inputs the training data xP1.2 to the first NN 50a and calculates the intermediate feature quantity zP1.2. Similarly, the learning data inputs the training data xP2.2 to the first NN 50a and calculates the intermediate feature quantity zP2.2.

Subsequently, the learning device inputs the intermediate feature quantity zP1.2 to the second NN 50b and calculates the output label yP1.2'. Similarly, the learning device inputs to the second NN 50b to the intermediate feature quantity zP2.2 and calculates the output label yP2.2'.

Then, the learning device calculates the error between the output label yP1.2' and the correct label (not illustrated) of the training data xP1. Similarly, the learning device calculates the error between the output label yP2.2' and the correct label (not illustrated) of the training xP2. Subsequently, the learning device implements the backpropagation method and learns the parameter of the first NN 50a and the parameter of the second NN 50b in order to ensure that the errors become smaller.

Moreover, the learning device calculates the degree of similarity between the intermediate feature quantity zP1.2 and the reference feature quantity zP1 of the training data xP1. Similarly, the learning device calculates the intermediate feature quantity zP2.2 and the reference feature quantity zP2 of the training data xP2. Then, the learning data implements the backpropagation method and learns the parameter of the first NN 50a and the reference feature quantities zP1 and zP2 in order to ensure that the degrees of similarity become higher.

The learning device performs the abovementioned operations in a repeated manner with respect to other sets of training data stored in the database 140P, and learns the parameter of the first NN, the parameter of the second NN, and the reference feature quantities corresponding to various sets of training data. The learnt reference feature quantities (zP1, zP2, and the reference feature quantities of other sets of original data (not illustrated)) are stored in a reference feature quantity database 144.

Figure 3:
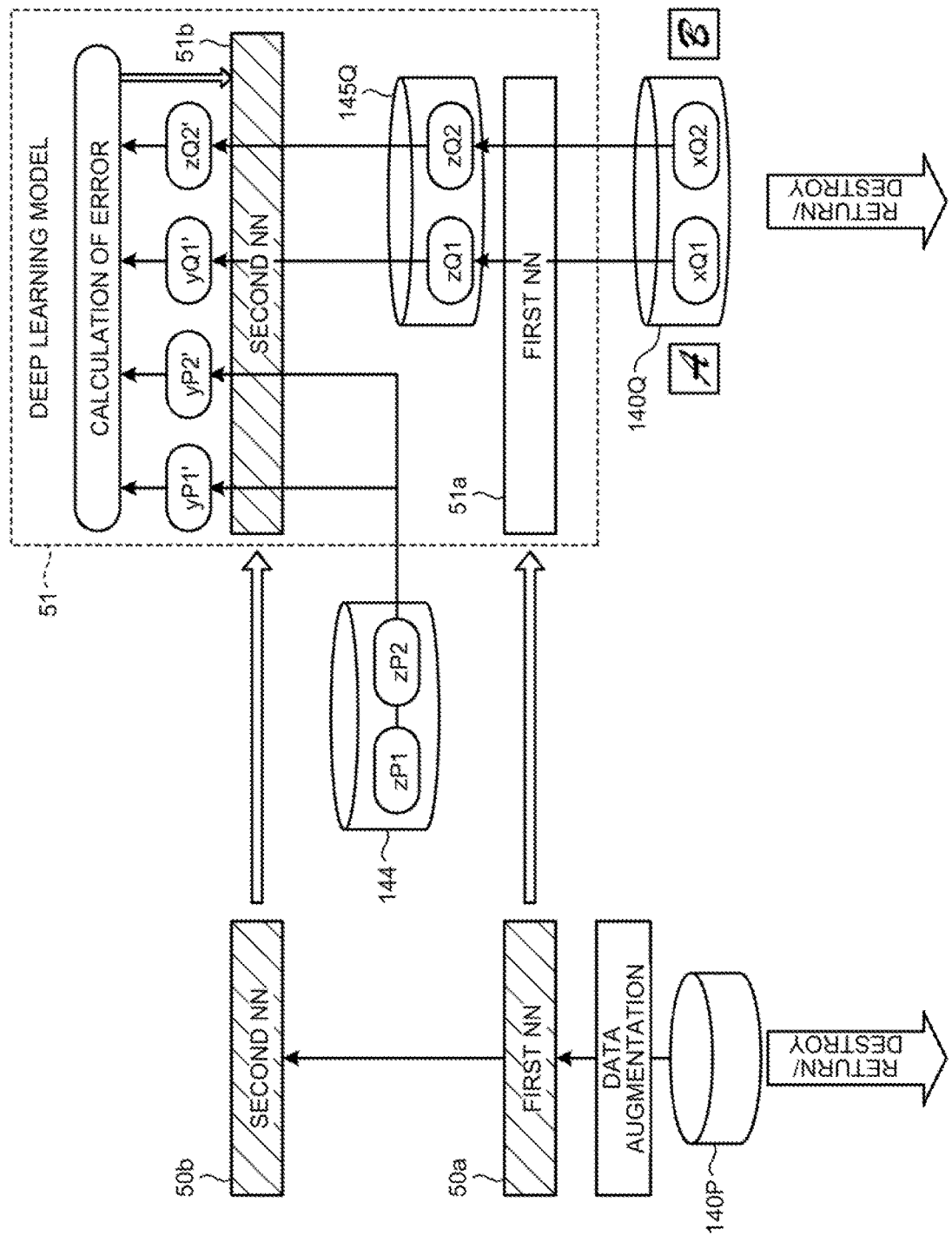
FIG. 3 is a diagram (3) for explaining the operations performed in the learning device according to the first embodiment.

The following explanation is given with reference to FIG. 3. When the learning of the deep learning model 50 is over, the information stored in the database 140P is returned to the customer P or is destroyed. The learning device sequentially learns a deep learning model 51 using the parameter of the first NN 50a as learnt in the deep learning model 50, the parameter of the second NN 50b as learnt in the deep learning model 50, the reference feature quantities stored in the reference feature quantity database 144, and the original training data of the customer Q. The original training data of the customer Q is stored in a database 140Q.

The deep learning model 51 includes a first NN 51a and a second NN 51b. The learning device sets the already-learnt parameter of the first NN 50a as the parameter of the first NN 51a. Similarly, the learning device sets the already-learnt parameter of the second NN 51b as the parameter of the second NN 50b. In the deep learning model 51, the parameter of the first NN 51a is not learnt.

Then, the learning device inputs the training data xQ1, which is stored in the database 140Q, to the first NN 51a; calculates the intermediate feature quantity zQ1; and stores it in an intermediate feature quantity database 145Q. Similarly, the learning inputs the training data xQ2, which is stored in the database 140Q, to the first NN 51a; calculates the intermediate feature quantity zQ2; and stores it in the intermediate feature quantity database 145Q.

Moreover, the learning device inputs the reference feature quantity zP1, which is stored in the reference feature quantity database 144, to the second NN 51b; and calculates the output label yP1'. Similarly, the learning device inputs the reference feature quantity zP2, which is stored in the reference feature quantity database 144, to the second NN 51b; and calculates the output label yP2'. Furthermore, the learning device inputs the intermediate feature quantity zQ1, which is stored in the intermediate feature quantity database 145Q, to the second MM 51b; and calculates the output label yQ1'. Similarly, the learning device inputs the intermediate feature quantity zQ2, which is stored in the intermediate feature quantity database 145Q, to the second NN 51b; and calculates an output label yQ2'.

Then, the learning device calculates the error between output label yP1' and the correct label (not illustrated, same hereinafter). Similarly, the learning device calculates the error between the output label P2' and the correct label. Moreover, the learning device calculates the error between the output label yQ1' and the correct label. Similarly, the learning device calculates the error between the output label yQ2' and the correct label. Subsequently, the learning device implements the backpropagation method and learns the parameter of tho second NN 51b in order to ensure that the errors become smaller.

The learning device performs the abovementioned operations in a repeated manner also with respect to other sets of training data stored in the database 140Q, and learns the parameter of the second NN 51b. When the learning of the deep learning model 51 is over, the learning device either returns the information in the database 140Q to the customer Q or destroys the information.

Figure 4:
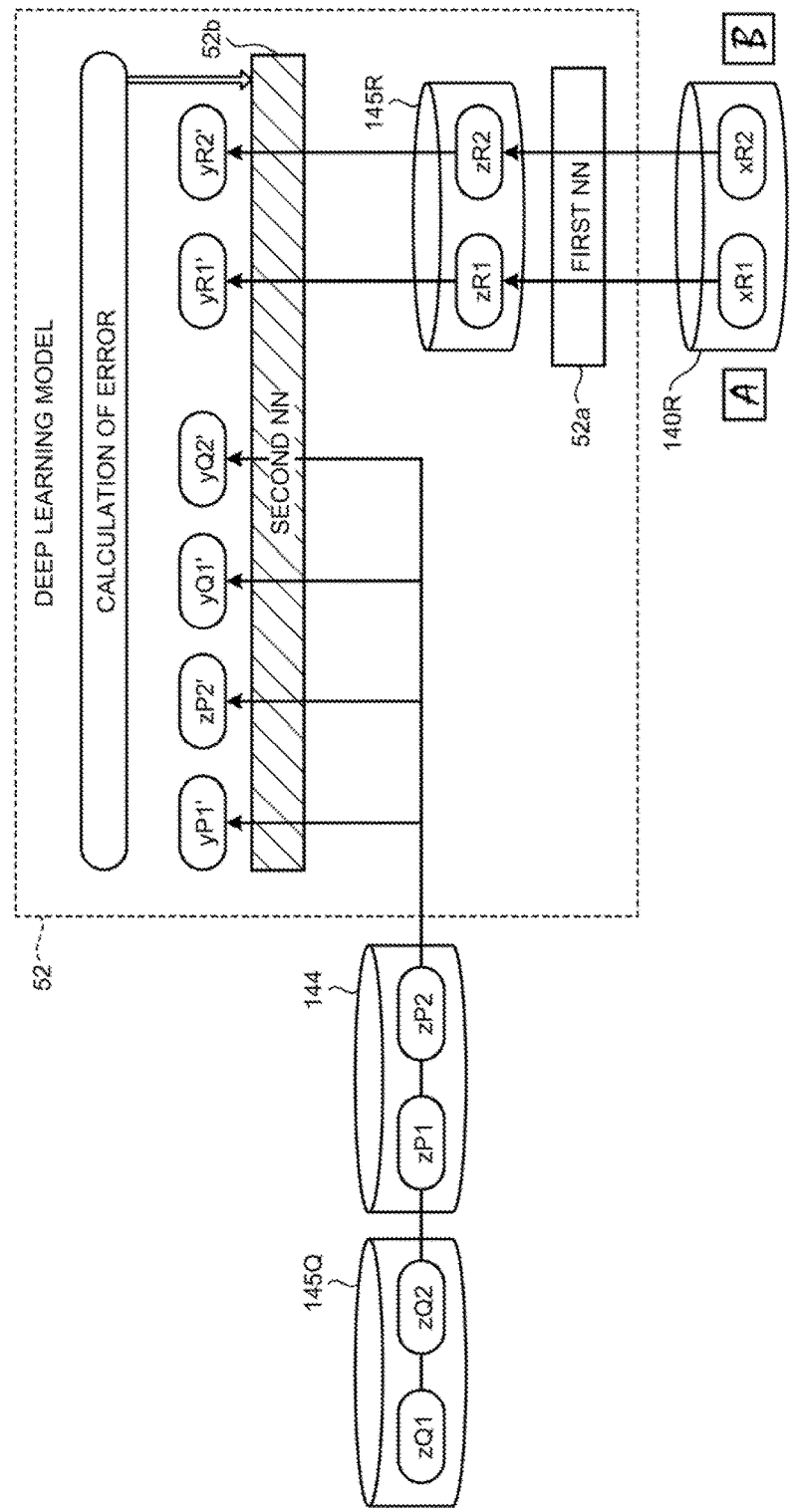
FIG. 4 is a diagram (4) for explaining the operations performed in the learning device according to the first embodiment.

The following explanation is given with reference to FIG. 4. The learning device sequentially learns a deep learning model 52 using the original training data of a customer R and using other data. Herein, sets of original training data xR1 and xR2 are stored in a database 140R. In the database 140R, other training data of the customer R can also be stored.

The other data contains the parameter of the first NN 50a learnt using the deep learning model 50, the parameter of the second NN 51b learnt using the deep learning model 51, the reference feature quantities in the reference feature quantity database 144, and the intermediate feature quantities in the intermediate feature quantity database 145Q.

The deep learning model 52 includes a first NN 52a and a second NN 52b. The learning device sets the already-learnt parameter of the first NN 50a (or the first NN 51a) as the parameter of the first NN 52a. Similarly, the learning device sets the already-learnt parameter of the second NN 51b as the parameter of the second NN 52b.

Then, the learning device inputs the training data xR1, which is stored in the database 140R, to the first NN 52a; calculates the intermediate feature quantity zR1; and stores it in an intermediate feature quantity database 145R. Similarly, the learning device inputs the training data xR2, which is stored in the database 140R, to the first NN 52a; calculates the intermediate feature quantity zR2; and stores it in the intermediate feature quantity database 145R.

Subsequently, the learning device inputs the reference feature quantity zP1, which is stored in the reference feature quantity database 144, to the second NN 52b; and calculates the output label yP1'. Similarly, the learning device inputs the reference feature quantity zP2, which is stored in the reference feature quantity database 144, to the second NN 52b; and calculates the output label yP2'. Moreover, the learning device inputs the intermediate feature quantity zQ1, which is stored in the intermediate feature quantity database 145Q, to the second NN 52b; and calculates the output label yQ1'. Similarly, the learning device inputs the intermediate feature quantity zQ2, which is stored in the reference feature quantity database 145Q, to the second NN 52b; and calculates the output label yQ2'.

Then, the learning device calculates the error between the output label yP1' and the correct label (not illustrated, same hereinafter). Similarly, the learning device calculates the error between the output and the correct label. Moreover, the learning device calculates the error between the output label yQ1' and the correct label. Similarly, the learning device calculates the error between the output label yQ2' and the correct label. Furthermore, the learning device calculates the error between the output label yR1' and the correct label. Similarly, the learning device calculates the error between the output label yR2' and the correct label. Then, the learning device implements the backpropagation method and learns the parameter of the second NN 52b in order to ensure that the errors become smaller.

The learning device performs the abovementioned operations in a repeated manner also with respect to the other training data stored in the database 140R, and learns the parameter of the second NN 52b. When the learning of the deep learning model 52 is over, the learning device either returns the information of the database 140R to the customer R or destroys the information.

As described above, during the first round of learning, the learning device according to the first embodiment learns the parameter of the first NN and learns the reference feature quantity in order to ensure that the intermediate feature quantities obtained as a result of inputting the data-augmented training data to the first NN approach the respective reference feature quantities. During the sequential learning performed in the second round, the learning device makes use of the reference feature quantities learnt during the first round of learning, as well as learns the parameter of the second NN using new training data. Each reference feature quantity can be said to be the representative intermediate feature quantity of a plurality of sets of training data obtained by data augmentation of the original training data. The information that is useful in each set of data-augmented training data remains available in the corresponding reference feature quantity. Thus, if the sequential learning of the second NN is performed using the reference feature quantities, it becomes possible to reduce the volume of data and at the same time continually use the feature quantities of the data-augmented training data, thereby enabling achieving enhancement in the learning accuracy of the deep learning model.

Figure 5:
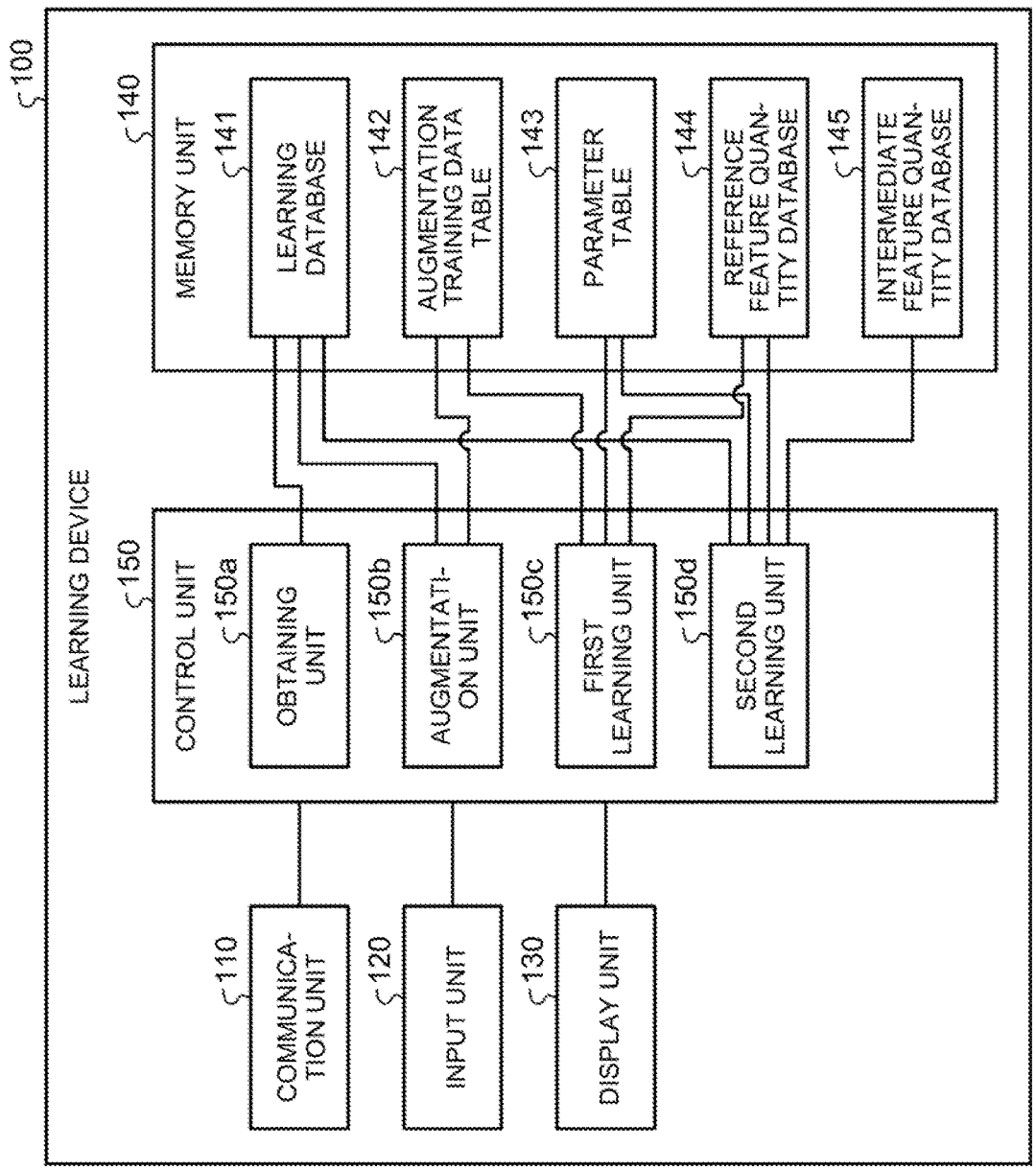
FIG. 5 is a functional block diagram illustrating a configuration of the learning device according to the first embodiment.

Given below is the explanation of an exemplary configuration of the learning device according to the first embodiment. FIG. 5 is a functional block diagram illustrating a configuration of the learning device according to the first embodiment. As illustrated in FIG. 5, a learning device 100 includes a communication unit 110, an input unit 120, a display unit 130, a memory unit 140, and a control unit 150.

The communication unit 110 is a processing unit that performs data communication with external devices (not illustrated) via a network. The communication unit 110 corresponds to a communication device. For example, the communication unit 110 receives the information about a learning database 141 (described later) from the external device of each customer. Moreover, the control unit 150 (described later) communicates data with external devices.

The input unit 120 is an input device that is used to input a variety of information to the learning device 100. For example, the input unit 120 corresponds to a keyboard, a mouse, or a touch-sensitive panel.

The display unit 130 is a display device that displays a variety of information output from the control unit 150. For example, the display unit 130 corresponds to a liquid crystal display or a touch-sensitive panel.

The memory unit 140 includes the learning database 141, an augmentation training data table 142, a parameter table 143, a reference feature quantity database 144, and an intermediate feature quantity database 145. The memory unit 140 corresponds to a semiconductor memory device such as a random access memory (RAM), a read only memory (ROM), or a flash memory; or a memory device such as a hard disk drive (HDD).

The learning database 141 is used to store information of the database notified by each customer. For example, the databases notified by the customers correspond to the databases 140P, 140Q, and 140R. The learning database 141 is used to store the information of any one of the databases 140P, 140Q, and 140R; and a deep learning model is learnt using the stored database. After the learning is over, when a return instruction or a destruction instruction is received, the target information stored in the learning database 141 is deleted.

FIG. 6 is a diagram illustrating an exemplary data structure of the learning database according to the first embodiment. As illustrated in FIG. 6, in the learning database 141; data numbers, training data, and correct labels are held in a corresponding manner. A data number is a number uniquely assigned to each set of original training data. For example, the training data "xP1" has the correct label "yP1" associated thereto and has a data number "p001" assigned thereto.

The augmentation training data table 142 is a table for holding the training data that has been subjected to data augmentation based on the original training data. FIG. 7 is a diagram illustrating an exemplary data structure of the augmentation training data table according to the first embodiment. As illustrated in FIG. 7, in the augmentation training data table 142; data numbers, data-augmented training data, and correct labels are held in a corresponding manner. A data number is a number enabling unique identification of each set of original training data serving as the basis for data augmentation. The correct label corresponding to a set of data-augmented training data is a correct label associated to the original training data corresponding to a data number.

The parameter table 143 is a table for holding the parameters of the first NN and the parameters of the second NN. FIG. 8 is a diagram illustrating an exemplary data structure of the parameter table according to the first embodiment. As illustrated in FIG. 8, in the parameter table 143, identification information and parameters are held in a corresponding manner. The identification information enables identification of each neural network. The parameter represents the parameter set in each neural network. A neural network has a plurality of layers, and each layer includes a plurality of nodes linked by edges. Each layer has a function called an activating function, and has a bias value. An edge has a weight assigned thereto. In the first embodiment, the bias values and the weights set in a neural network are collectively referred to as the "parameter".

The reference feature quantity database 144 is a database for storing the reference feature quantities set with respect to the sets of original training data in the first round. FIG. 9 is a diagram illustrating an exemplary data structure of the reference feature quantity database according to the first embodiment. As illustrated in FIG. 9, in the reference feature quantity database 144; data numbers, reference feature quantities, and correct labels are held in a corresponding manner. A data number is a number uniquely assigned to a set of original training data. It is assumed that the initial value of each reference feature quantity is set in advance. A correct label is associated to a set of original training data corresponding to a data number.

Figures 10, 11:
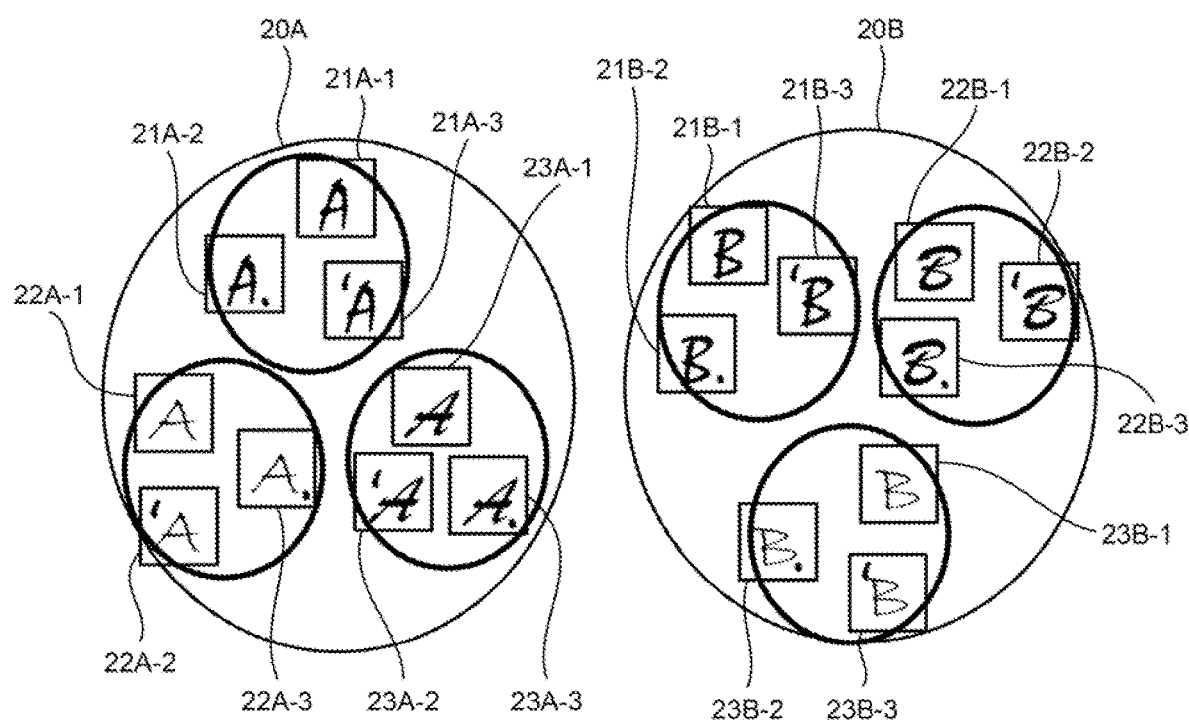
FIG. 10 is a diagram illustrating an exemplary data structure of an intermediate feature quantity database according to the first embodiment.
FIG. 11 is a diagram for explaining an example of data augmentation.

The intermediate feature quantity database 145 is a database for storing the intermediate feature quantities that are calculated as a result of inputting training data to the first NN. FIG. 10 is a diagram illustrating an exemplary data structure of the intermediate feature quantity database according to the first embodiment. As illustrated in FIG. 10, in the intermediate feature quantity database 145; data numbers, intermediate feature quantities, and correct labels are held in a corresponding manner. A data number is a number enabling unique identification of a set of training data before being input to the first NN. An intermediate feature quantity is a feature quantity calculated as a result of inputting a set of training data to the first NN. A correct label is associated to a set of original training data corresponding to a data number.

Returning to the explanation with reference to FIG. 5, the control unit 150 includes an obtaining unit 150a, an augmentation unit 150b, a first learning unit 150c, and a second learning unit 150d. The control unit 150 is implemented using a central processing unit (CPU) or a micro processing unit (MPU). Alternatively, the control unit 150 can be implemented using hard wired logic such as an application specific integrated circuit (ASIC) or a field-programmable gate array (FPGA).

The obtaining unit 150a is a processing unit that obtains the information about the learning database 141 from the external devices of the customers. Then, the obtaining unit 150a stores the obtained information about the learning database 141 in the learning database 141. For example, when the information about the database 140P of the customer P is obtained, the obtaining unit 150a stores the obtained information about the database 140P in the learning database 141. Similarly, when the information about the database 140Q of the customer Q is obtained, the obtaining unit 150a stores the obtained information about the database 140Q in the learning database 141. Moreover, when the information about the database 140R of the customer R is obtained, the obtaining unit 150a stores the information about the obtained database 140R in the learning database 141.

Meanwhile, when the information about the database 140P is stored in the learning database 141 and if a return request for returning the database 140P is received, the obtaining unit 150a performs the following operations. The obtaining unit 150a sends the information about the database 140P to the external device of the customer P, and deletes the information about the database 140P from the learning database 141. Moreover, the obtaining unit 150a can also send the information about the deep learning model 50, which was learnt based, on the database 140P, to the external device of the customer P.

When the information about the database 140Q is stored in the learning database 141 and if a return request for returning the database 140Q is received, the obtaining unit 150a performs the following operations. The obtaining unit 150a sends the information about the database 140Q to the external device of the customer Q, and deletes the information about the database 140Q from the learning database 141. Moreover, the obtaining unit 150a can also send the information about the deep learning model 51, which was learnt based on the database 140Q, to the external device of the customer Q.

When the information about the database 140R is stored in the learning database 141 and if a return request for returning the database 140R is received, the obtaining unit 150a performs the following operations. The obtaining unit 150a sends the information about the database 140R to the external device of the customer R, and deletes the information about the database 140R from the learning database 141. Moreover, the obtaining unit 150a can also send the information about the deep learning model 52, which was learnt based on the database 140R, to the external device of the customer R.

The augmentation unit 150b is a processing unit that performs data augmentation with respect to the original training data stored in the learning database 141 and generates a plurality of sets of training data. For example, the data augmentation performed by the augmentation unit 150b corresponds to processing such as noise addition, parallel translation, and data missing with respect to training data.

FIG. 11 is a diagram for explaining an example of data augmentation. In the example illustrated in FIG. 11, a training data group 20A includes sets of training data 21A-1 to 21A-3, sets of training data 22A-1 to 22A-3, and sets of training data 23A-1 to 23A-3. For example, the training data group 20A has a correct label "A" associated thereto.

The sets of training data 21A-2 and 21A-3 are obtained as a result of performing data augmentation with respect to the original training data 21A-1. The sets of training data 22A-2 and 22A-3 are obtained as a result of performing data augmentation with respect to the original training data 22A-1. The sets of training data 23A-2 and 23A-3 are obtained as a result of performing data augmentation with respect to the original training data 23A-1.

A training date group 20B includes sets of training data 21B-1 to 21B-3, sets of training data 22B-1 to 22B-3, and sets of training data 23B-1 to 23B-3. For example, the training data group 20B has a correct label "B" associated thereto.

The sets of training data 21B-2 and 21B-3 are obtained as a result of performing data augmentation with respect to the original training data 21B-1. The sets of training data 22B-2 and 22B-3 are obtained as a result of performing data augmentation with respect to the original training data 22B-1. The sets of training data 23B-2 and 23B-3 are obtained as a result of performing data augmentation with respect to the original training data 23B-1.

With reference to FIG. 11, as an example, the augmentation unit 150b performs data augmentation with respect to the training data 21A-1 and generates the sets of training data 21A-2 and 21A-3.

In the augmentation training data table 142, the augmentation unit 150b stores the following information in a corresponding manner: data numbers of the sets of original training data, sets of data-augmented training data, and correct labels corresponding to the sets of original training data. The augmentation unit 150b performs the abovementioned operations in a repeated manner with respect to each set of training data included in the information stored in the learning database 141 in the first round (for example, the information about the database 140P).

The first learning unit 150c is a processing unit that performs the first round of learning of the deep learning model 50 based on the training data stored in the augmentation training data table 142 (i.e., based on the data-augmented training data). For example, the first learning unit 150c performs an operation of generating intermediate feature quantities, an operation of calculating the degrees of similarity among the intermediate feature quantities, and an operation of learning.

The following explanation is given about the "operation of generating intermediate feature quantities" as performed by the first learning unit 150c. The first learning unit 150c executes the first NN 50a, and sets a parameter θ1, which is stored in the parameter table 143, as the parameter of the first NN 50a. Then, the first learning unit 150c obtains, from the augmentation training data table 142, a plurality of sets of training data subjected to data augmentation based on the same training data; and sequentially inputs the obtained sets of training data to the first NN 50a. Subsequently, the first learning unit 150c calculates the intermediate feature quantity of each set of training data using the parameter θ1 set in the first NN 50a.

Then, the first learning unit 150c stores the intermediate feature quantities, which correspond to the sets of training data subjected to data augmentation based on the same training data, in a corresponding manner to the correct labels associated to the sets of training data.

Returning to the explanation with reference to FIG. 1, the first learning unit 150c inputs the data-augmented training data xP1.1 to the first NN 50a, and calculates the intermediate feature quantity zP1.1. Thus, the correct label of the intermediate feature quantity zP1.1 is the correct label corresponding to the training data xP1. Similarly, the first learning unit 150c inputs the data-augmented training data xP2.1 to the first NN 50a, and calculates the intermediate feature quantity zP2.1. Thus, the correct label of the intermediate feature quantity zP2.1 is the correct label corresponding to the training data xP2.

The following explanation is given about the "operation of calculating the degrees of similarity among the intermediate feature quantities" as performed by the first learning unit 150c. For example, the first learning unit 150c calculates, as the degree of similarity, the square error between the reference feature quantity corresponding to a data number and the intermediate feature quantity corresponding to that data number. Herein, smaller the square error, the higher is the degree of similarity between the reference feature quantity and the intermediate feature quantity.

Explained with reference to FIG. 1, the degree of similarity between the intermediate feature quantity zP1.1 and the reference feature quantity zP1 is the square error therebetween. Similarly, the degree of similarity between the intermediate feature quantity zP2.1 and the reference feature quantity zP2 is the square error therebetween.

The following explanation is given about the "operation of learning" as performed by the first learning unit 150c. The first learning unit 150c executes the second NN 50b and sets a parameter θ2, which is stored in the parameter table 143, as the parameter of the second NN 50b.

Then, the first learning unit 150c inputs the intermediate feature quantities, which are calculated in the "operation of generating intermediate feature quantities", to the second NN 50b. Subsequently, the first learning unit 150c calculates an output label using the parameter θ2 set in the second NN 50b.

Explained below with reference to FIG. 1 are the operations performed by the first learning unit 150c. The first learning unit 150c inputs the intermediate feature quantity zP1.1 to the second NN 50b, and calculates the output label yP1.1'. Moreover, the first learning unit 150c inputs the intermediate feature quantity zP2.1 to the second NN 50b, and calculates the output label yP2.1'.

Then, the first learning unit 150c calculates the error between the output label yP1.1' and the correct label yP1.1 (not illustrated) of the training data xP1. Similarly, the first learning unit 150c calculates the error between the output label yP2.1' and the correct label yP2.1 (not illustrated) of the training data xP2. Subsequently, the first learning unit 150c implements the backpropagation method and learns the parameter θ1 of the first NN 50a and the parameter θ2 of the second NN 50b in order to ensure that the errors become smaller.

Moreover, the first learning unit 150c learns the parameter θ1 and the reference feature quantity zP1 of the first NN 50a in order to ensure that there is an increase in the degree of similarity between the intermediate feature quantity zP1.1 and the reference feature quantity zP1 of the training data xP1. Similarly, the first learning unit 150c learns the parameter θ1 and the reference feature quantity zP2 of the first NN 50a in order to ensure that there is an increase in the degree of similarity between the intermediate feature quantity zP2.1 and the reference feature quantity zP2 of the training data xP1.

The first learning unit 150c performs the abovementioned operations in a repeated manner with respect to each set of training data of the customer P stored in the learning database 141 (the database 140P); and resultantly learns the parameter θ1 of the first NN 50a, the parameter θ2 of the second NN 50b, and the reference feature quantity. After the learning is over, the first learning unit 150c updates the parameter table 143 with the learnt parameters θ1 and θ2.

Moreover, the first learning unit 150c updates the reference feature quantity database 144 with the learnt reference feature quantity.

When the learning of the deep learning model 50 using each set of training data of the customer P stored in the learning database 141 (the database 140P) is over, the information about the database 140P gets deleted from the learning database 141. Subsequently, the obtaining unit 150a stores the information about the database 140Q of the customer Q in the learning database 141, and the second learning unit 150d described below) performs operations.

The second learning unit 150d is a processing unit that performs sequential learning of a deep learning model based on the training data stored in the learning database 141, the parameter table 143, and the reference feature quantity database 144. Firstly, in the learning database 141, it is assumed that the information about the database 140Q of the customer Q is stored. The second learning unit 150d performs, for example, an operation (1) of generating intermediate feature quantities and an operation (1) of learning.

The following explanation is given about the "operation (1) of generating intermediate feature quantities". The second learning unit 150d executes the first NN 51a and sets the parameter $\theta1$, which is stored in the parameter table 143, as the parameter of the first NN 51a. Then, the second learning unit 150d sequentially inputs the sets of training data, which are stored in the earning database 141, to the first NN 51a. Subsequently, using the parameter $\theta1$ set in the first NN 51a, the second earning unit 150d calculates the intermediate feature quantity of each of a plurality of sets of training data.

Moreover, the second learning unit 150d stores the following information in a corresponding manner in the intermediate feature quantity database 145 (145Q): the data numbers of the sets of training data; the intermediate feature quantities calculated from the sets of training data; and the correct labels associated to the sets of training data.

Returning to the explanation with reference to FIG. 3, the second learning unit 150d inputs the training data xQ1 to the first NN 51a, and calculates the intermediate feature quantity zQ1. Then, the second earning unit 150d stores the following information in a corresponding manner in the intermediate feature quantity database 145 (145Q): the date number of the training data xQ1; the intermediate feature quantity zQ1; and the correct label of the training data xQ1.

Similarly, the second learning unit 150d inputs the raining data xQ2 to the first NN 51a, and calculates the intermediate feature quantity zQ2. Then, the second learning unit 150d stores the following information in a corresponding manner in the intermediate feature quantity database 145 (145Q): the data number of the training data xQ2; the intermediate feature quantity zQ2; and the correct label of the training data xQ2.

The following explanation is given about the "operation (1) of learning" performed by the second learning unit 150d. The second learning unit 150d executes the second NN 51b and sets the parameter $\theta2$, which is stored in the parameter table 143, as the parameter of the second NN 51b.

Then, the second learning unit 150d inputs each reference feature quantity, which is stored in the reference feature quantity database 144, to the second NN 51b; and calculates an output label using the parameter $\theta2$. Moreover, the second learning unit 150d inputs each intermediate feature quantity, which is stored in the intermediate feature quantity database 145, to the second NN 51b; and calculates an output label using the parameter $\theta2$.

The operations performed by the second learning unit 150d are explained below with reference to FIG. 3. The second learning unit 150d inputs the reference feature quantity zP1, which is stored in the reference feature quantity database 144, to the second NN 51b, and calculates the output label yP1'. Similarly, the second learning unit 150d inputs the reference feature quantity zP2, which is stored in the reference feature quantity database 144, to the second NN 51b, and calculates the output label yP2'.

Moreover, the second learning unit 150d inputs the intermediate feature quantity zQ1, which is stored in the intermediate feature quantity database 145 (145Q), to the second NN 51b, and calculates the output label yQ1'. Similarly, the second learning unit 150d inputs the intermediate feature quantity zQ2, which is stored in the intermediate feature quantity database 145 (145Q), to the second NN 51b, and calculates the output label yQ2'.

Then, the second learning unit 150d calculates the error between the output label P1.1' and the correct label yP1.1 (not illustrated) of the reference feature quantity zP1. Similarly, the second learning unit 150d calculates the error between the output label P2.1' and the correct label yP2.1 (not illustrated) of the reference feature quantity zP2.

Moreover, the second learning unit 150d calculates the error between the output label yQ1' and the correct label yQ1 (not illustrated) of the intermediate feature quantity zQ1. Similarly, the second learning unit 150d calculates the error between the output label yQ2' and the correct label yQ2 (not illustrated) of the intermediate feature quantity zQ2.

Then, the second learning unit 150d implements the backpropagation method and learns the parameter $\theta2$ of the second NN 51b in order to ensure that the errors become smaller.

The second learning unit 150d performs the abovementioned operations in a repeated manner with respect to each set of training data of the customer Q as stored in the learning database 141 (the database 140Q); and learns the parameter $\theta2$ of the second NN 51b. Then, the second learning unit 150d updates the parameter table 143 with the learnt parameter $\theta2$. Subsequently, the second learning unit 150d stores each intermediate feature quantity, which is generated during the process of learning, in the intermediate feature quantity database 145.

When the learning of the deep learning model 51, which is performed using each set of training data of the customer Q stored in the learning database 141 (the database 140Q), is over; the information about the database 140Q is deleted from the learning database 141. Subsequently, the obtaining unit 150a stores the information about the database 140R of the customer R in the learning database 141, and the second learning unit 150d (described later) performs operations.

In the learning database 141, it is assumed that the information about the database 140R of the customer R is stored. For example, in an identical manner to the operations performed using the database 140Q, the second learning unit 150d performs an operation (2) of generating intermediate feature quantities and an operation (2) of learning.

The following explanation is given about the "operation (2) of generating intermediate feature quantities" as performed by the second learning unit 150d. The second learning unit 150d executes the first NN 52a and sets the parameter $\theta1$, which is stored in the parameter table 143, as the parameter of the first NN 52a. Moreover, the second learning unit 150d sequentially inputs the sets of training data, which are stored in the learning database 141, to the first NN 52a. Then, using the parameter $\theta1$ set in the first NN 52a, the second learning unit 150d calculates the intermediate feature quantity of each of a plurality of sets of training data.

Subsequently, the second learning unit 150d stores the following information in a corresponding manner in the intermediate feature quantity database 145 (145R): the data numbers of the sets of training data; the intermediate feature quantities calculated from the sets of training data; and the correct labels associated to the sets of training data.

Returning to the explanation with reference to FIG. 4, the second learning unit 150d inputs the training data xR1 to the first NN 52a, and calculates the intermediate feature quantity zR1. Then, the second learning unit 150d stores the following information in a corresponding manner in the intermediate feature quantity database 145 (145R): the data number of the training data xR1; the intermediate feature quantity zR1; and the correct label of the training data xR1.

Similarly, the second learning unit 150d inputs the training data xP2 to the first NN 52a, and calculates the intermediate feature quantity zR2. Then, the second learning unit 150d stores the following information in a corresponding manner in the intermediate feature quantity database 145 (145R): the date number of the training data xR2; the intermediate feature quantity zR2; and the correct label of the training data xR2.

The following explanation is given about the "operation (2) of learning" as performed the second learning unit 150d. The second learning unit 150d executes the second NN 52b and sets the parameter θ2, which is stored in the parameter table 143, as the parameter of the second NN 52b.

Then, the second learning unit 150d inputs each reference feature quantity, which is stored in the reference feature quantity database 144, to the second MN 52b; and calculates an output label using the parameter θ2. Moreover, the second learning unit 150d inputs each intermediate feature quantity, which is stored in the intermediate feature quantity database 145 (145Q), to the second NN 51b; and calculates an output label using the parameter θ2.

The operations performed by the second learning unit 150d are explained below with reference to FIG. 4. The second learning unit 150d inputs the reference feature quantity zP1, which is stored in the reference feature quantity database 144, to the second NN 52b; and calculates the output label yP1'. Similarly, the second learning unit 150d inputs the reference feature quantity zP2, which is stored in the reference feature quantity database 144, to the second NN 52b; and calculates the output label yP2'.

Moreover, the second learning unit 150d inputs the intermediate feature quantity zQ1, which is stored in the intermediate feature quantity database 145 (145Q), to the second NN 52b; and calculates the output label yQ1'. Similarly, the second learning unit 150d inputs the intermediate feature quantity zQ2, which is stored in the intermediate feature quantity database 145 (145Q), to the second NN 52b; and calculates the output label yQ2'.

Furthermore, the second learning unit 150d inputs the intermediate feature quantity zR1, which is stored in the intermediate feature quantity database 145 (145R), to the second NN 52b; and calculates the output label yR1'. Similarly, the second learning unit 150d inputs the intermediate feature quantity zR2, which is stored in the intermediate feature quantity database 145 (145R), to the second NN 52b; and calculates the output label yR2'.

Then, the second learning unit 150d calculates the error between the output label yP1.1' and the correct label yP1.1 (not illustrated) of the reference feature quantity zP1. Similarly, the second learning unit 150d calculates the error between the output label yP2.1' and the correct label yP2.1 (not illustrated) of the reference feature quantity zP2.

Moreover, the second learning unit 150d calculates the error between the output label yQ1' and the correct label yQ1 (not illustrated of the intermediate feature quantity zQ1. Similarly, the second learning unit 150d calculates the error between the output label yQ2' and the correct label yQ2 (not illustrated) of the intermediate feature quantity zQ2.

Furthermore, the second learning unit 150d calculates the error between the output label yR1' and the correct label yR1 (not illustrated) of the intermediate feature quantity zR1. Similarly, the second learning unit 150d calculates the error between the output label yR2' and the correct label yR2 (not illustrated) of the intermediate feature quantity zR2.

Then, the second learning unit 150d implements the backpropagation method and learns the parameter θ2 of the second NN 52b in order to ensure that the errors become smaller.

The second learning unit 150d performs the abovementioned operations in a repeated manner with respect to each set of training data of the customer R as stored in the learning database 141 (the database 140R); and learns the parameter θ2 of the second NN 52b. Then, the second learning unit 150d updates the parameter table 143 with the learnt parameter θ2. Moreover, the second learning unit 150d stores each intermediate feature quantity, which is generated during the process of learning, in the intermediate feature quantity database 145.

As a result of performing the operations described above, the first learning unit 150c and the second learning unit 150d sequentially learn the parameters of the deep learning models 50, 51, and 52. The first learning unit 150c and the second learning or 150d distinguish between the parameters of the deep learning models 50, 51, and 52; and store them in the parameter table 143.

Figure 12:
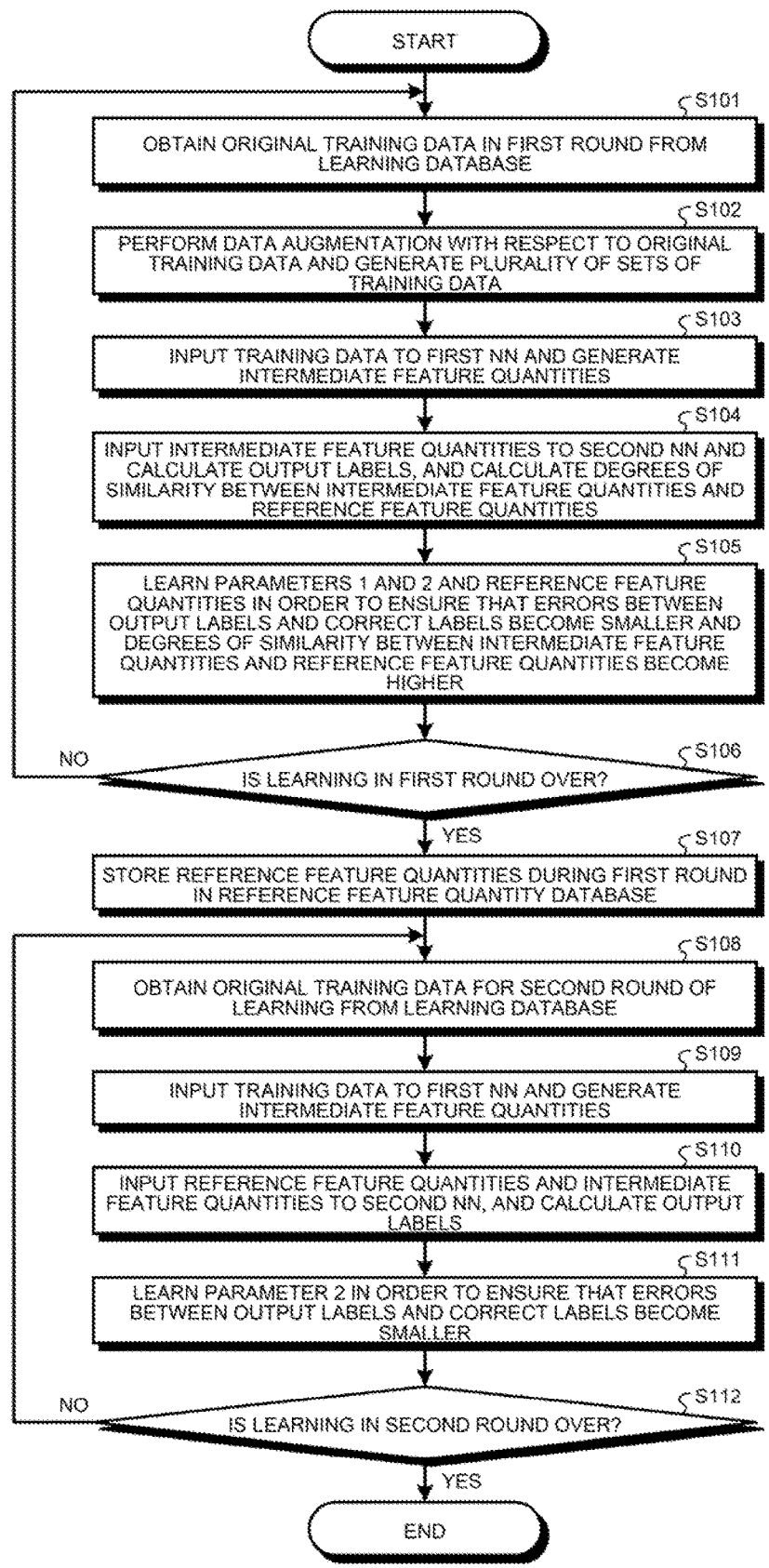
FIG. 12 is a flowchart for explaining the sequence of operations performed in the learning device according to the first embodiment.

Given below is the explanation of an exemplary sequence of operations performed in the learning device 100 according no the first embodiment. FIG. 12 is a flowchart for explaining the sequence of operations performed in the learning device according to the first embodiment. With reference to FIG. 12, as an example, the explanation is given about the operations performed during the sequential learning in the second round. As illustrated in FIG. 12, the augmentation unit 150b of the learning device 100 obtains the original training data in the first round from the learning database 141 (Step S101).

Then, the augmentation unit 150b performs data augmentation with respect to the original training data, and generates a plurality of sets of training data (Step S102). Subsequently, the first learning unit 150c of the learning device 100 inputs the sets of training data to the first NN 50a and generates intermediate feature quantities (Step S103).

The first learning unit 150c inputs the intermediate feature quantities to the second NN 50b, and calculates output labels. Then, the first learning unit 150c calculates the degrees of similarity between the intermediate feature quantities and the reference feature quantities (Step S104).

The first learning unit 150c learns the parameters θ1 and θ2 and the reference feature quantities in order to ensure that the errors between the output labels and the correct labels become smaller and that the degrees of similarity between the intermediate feature quantities and the reference feature quantities become higher (Step S105). Meanwhile, if the learning in the first round is not yet over (No at Step S106), then the system control returns to Step S101. On the other hand, when the learning in the first round is over. (Yes at Step S106), the system control proceeds to Step S107.

The first learning unit 150c stores the reference feature quantities during the first round in the reference feature quantity database 144 (Step S107). The second learning unit 150d obtains, from the learning database 141, the original training data for the second round of learning (Step S108).

Then, the second learning unit 150d inputs the training data to the first NN 51a and generates intermediate feature quantities (Step S109). Then, the second learning unit 150d inputs the reference feature quantities and the intermediate feature quantities to the second NN 51b, and calculates output labels (Step S110).

The second learning unit 150d learns the parameter θ1 in order to ensure that the errors between the output labels and the correct labels become smaller (Step S111). If the learning in the second round is not yet over (No at Step S112), then the system control returns to Step S108. On the other hand, when the learning in the second round is over (Yes at Step S112), it marks the end of the operations.

In the operations illustrated in FIG. 12, although the explanation is given about the operations performed for the learning in the second round, the same operations can be performed also for the learning after third round. For example, the second learning unit 150d performs the operations from Step S108 to Step S112 in each round of learning.

Given below is the explanation about the effects achieved in the learning device 100 according to the first embodiment. During the learning in the first round, the learning device 100 learns the parameter θ1 of the first NN and the reference feature quantities in order to ensure that each intermediate feature quantity obtained as a result of inputting a set of data-augmented training data to the first NN approaches the corresponding reference feature quantity. During the sequential learning in the second round, the learning device 100 makes use of the reference feature quantities learnt during the first round of learning, as well as performs operations to learn the parameter of the second NN using new training data. Each reference feature quantity can be said to be the representative intermediate feature quantity of a plurality of sets of training data obtained by data augmentation of original training data. The information that is useful in each set of data-augmented training data remains available in the corresponding reference feature quantity. Thus, if the sequential learning of the second NN is performed using the reference feature quantities, it becomes possible to reduce the volume of data and at the same time continually use the feature quantities of the data-augmented training data, thereby enabling achieving enhancement in the learning accuracy of the deep learning model.

Figure 13:
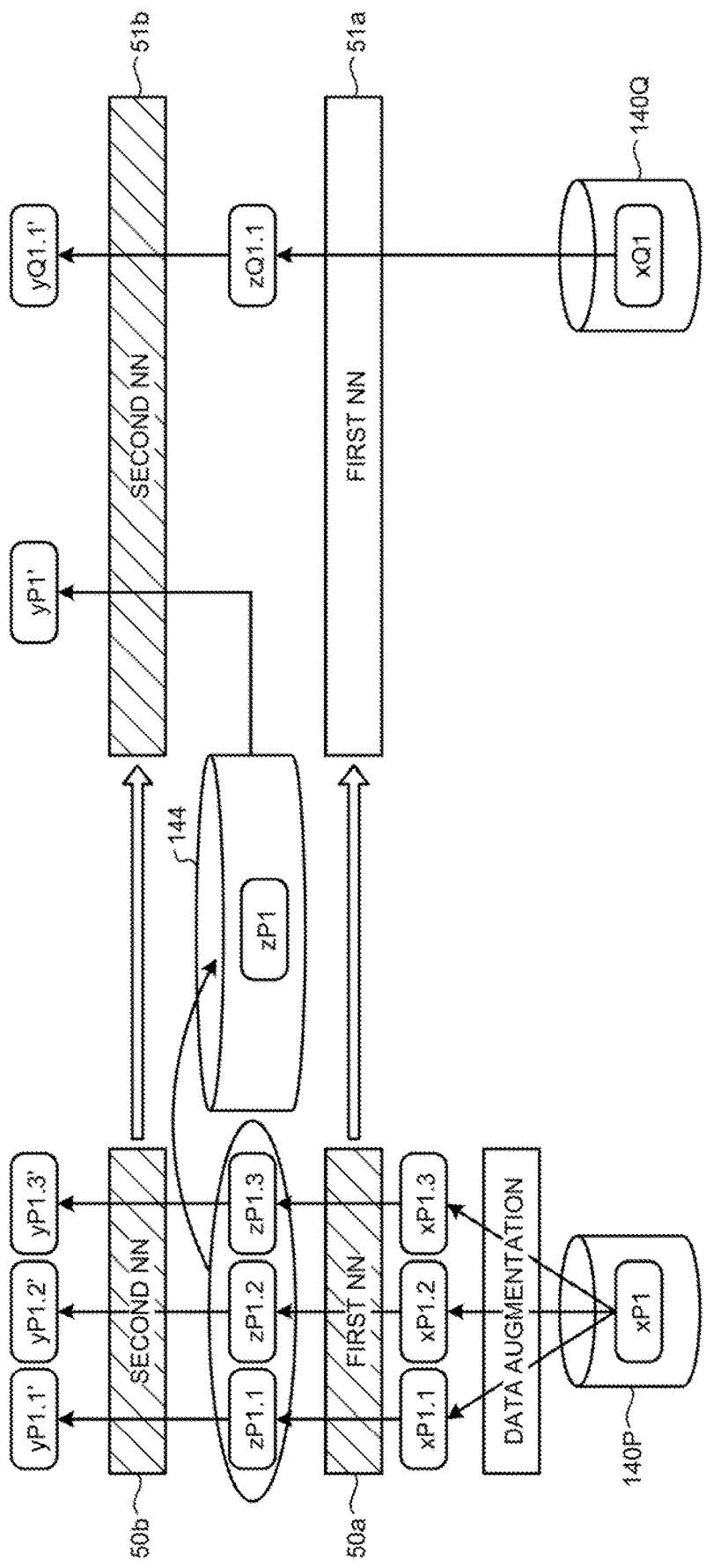
FIG. 13 is a diagram for explaining the effects achieved in the learning device according to the first embodiment.

FIG. 13 is a diagram for explaining the effects achieved in the earning device according to the first embodiment. As explained in the embodiment, the learning device 100 performs data augmentation with respect to the training data xP1 of the customer P and generates the sets of training data xP1.1, xP1.2, and xP1.3. Then, the learning device 100 inputs the sets of training data xP1.1, xP1.2, and xP1.3 to the first NN 50a, and calculates the intermediate feature quantities zP1.1, zP1.2, and zP1.3, respectively. Moreover, the learning device 100 inputs the intermediate feature quantities zP1.1, zP1.2, and zP1.3 to the first NN 50a, and calculates the output labels yP1.1', yP1.2', and yP1.3', respectively.

Then, the learning device 100 learns the parameter of the first NN 50a and the reference feature quantity zP1 in order to ensure that the intermediate feature quantities zP1.1, zP1.2, and zP1.3 approach the reference feature quantity zP1 of the training data xP1; and stores the learnt reference feature quantity zP1 in the reference feature quantity database 144. The learnt reference feature quantity zP1 that is stored in the reference feature quantity database 144 is used during the learning in the second round onward.

Since the intermediate feature quantities zP1.1, zP1.2, and zP1.3 are learnt in order to ensure that they approach the reference feature quantity zP1, there is only a small difference among the intermediate feature quantities zP1.1, zP1.2, and zP1.3. Hence, by storing the reference feature quantity zP1 in the reference feature quantity database 144 as the representative value of the intermediate feature quantities zP1.1, zP1.2, and zP1.3; the effects of data augmentation can be utilized even when the volume of data to be stored is reduced.

Moreover, during the learning in the second round onward, the learning device 100 uses the parameter θ1 of the first NN 50a, which is generated during the learning in the first round, without modification. As a result of setting the learnt parameter θ1 in the first NN 51a, the first NN 51a gets equipped with the data normalization function. That results in the reduction of the network scale, thereby enabling lowering of the learning cost.

[b] Second Embodiment

The operations performed in the learning device 100 according to the first embodiment are only exemplary, and alternatively the learning device 100 can learn the parameters of a deep learning model by performing some other operations. In a second embodiment, the explanation is given about other operations (1) and (2) that the learning device 100 can perform.

The following explanation is given about the other operation (1) performed in the learning device 100. For each set of original training data, the learning device 100 sets the reference feature quantity; and learns the parameters and the reference feature quantities as the evaluation indicators of the square error. However, that is not the only possible case. Alternatively, for example, the learning device 100 can set an average μ and a dispersion σ of the intermediate feature quantities as the reference feature quantity; and can learn the parameters and the reference feature quantity in order to ensure that the average and the dispersion of the intermediate feature quantities of a plurality of sets of training data, which is obtained by data augmentation with respect to the same training data, approach the reference feature quantity.

Figure 14:
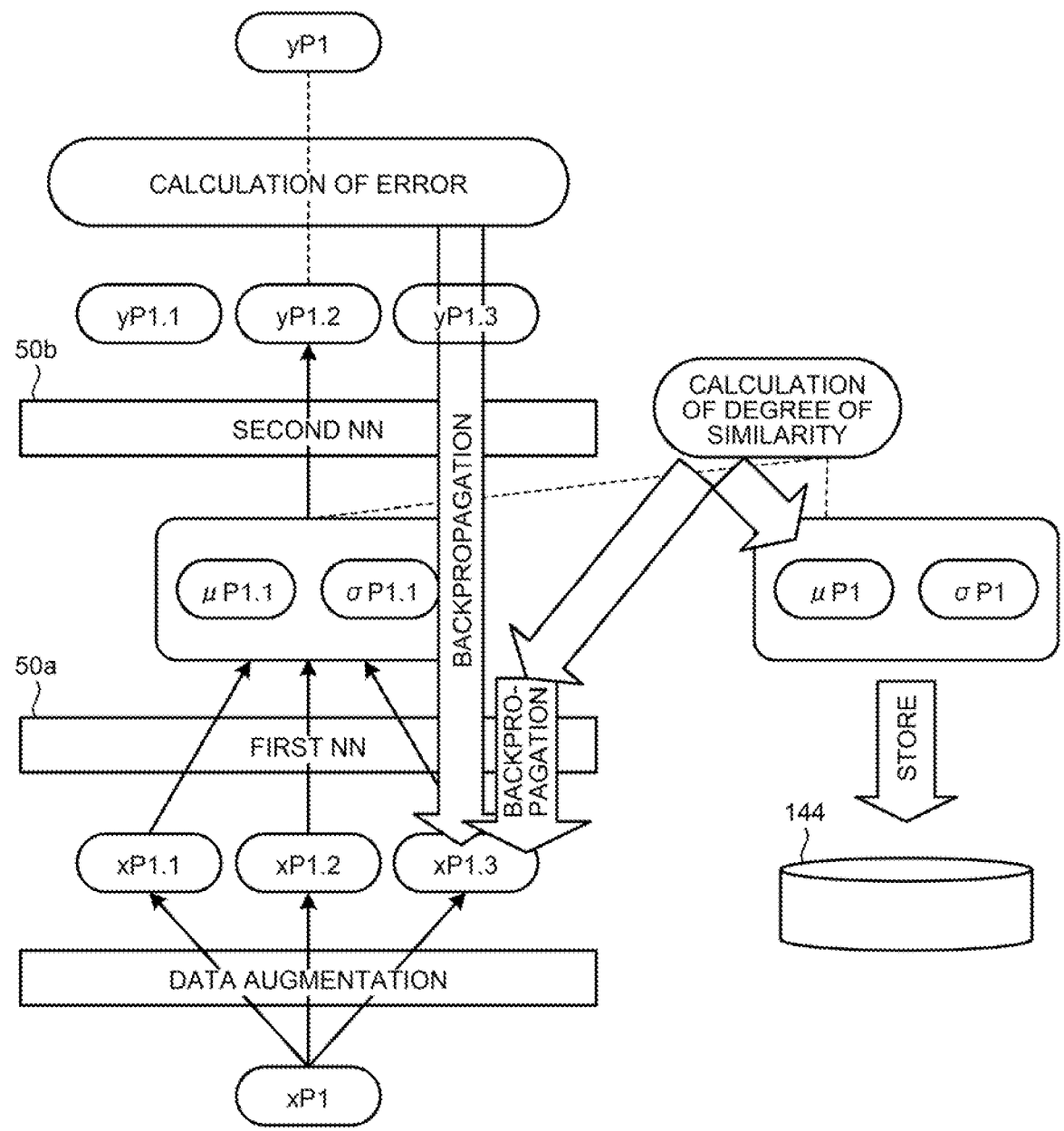
FIG. 14 is a diagram (1) for explaining an example of another operation (1) performed in the learning device.
Figure 15:
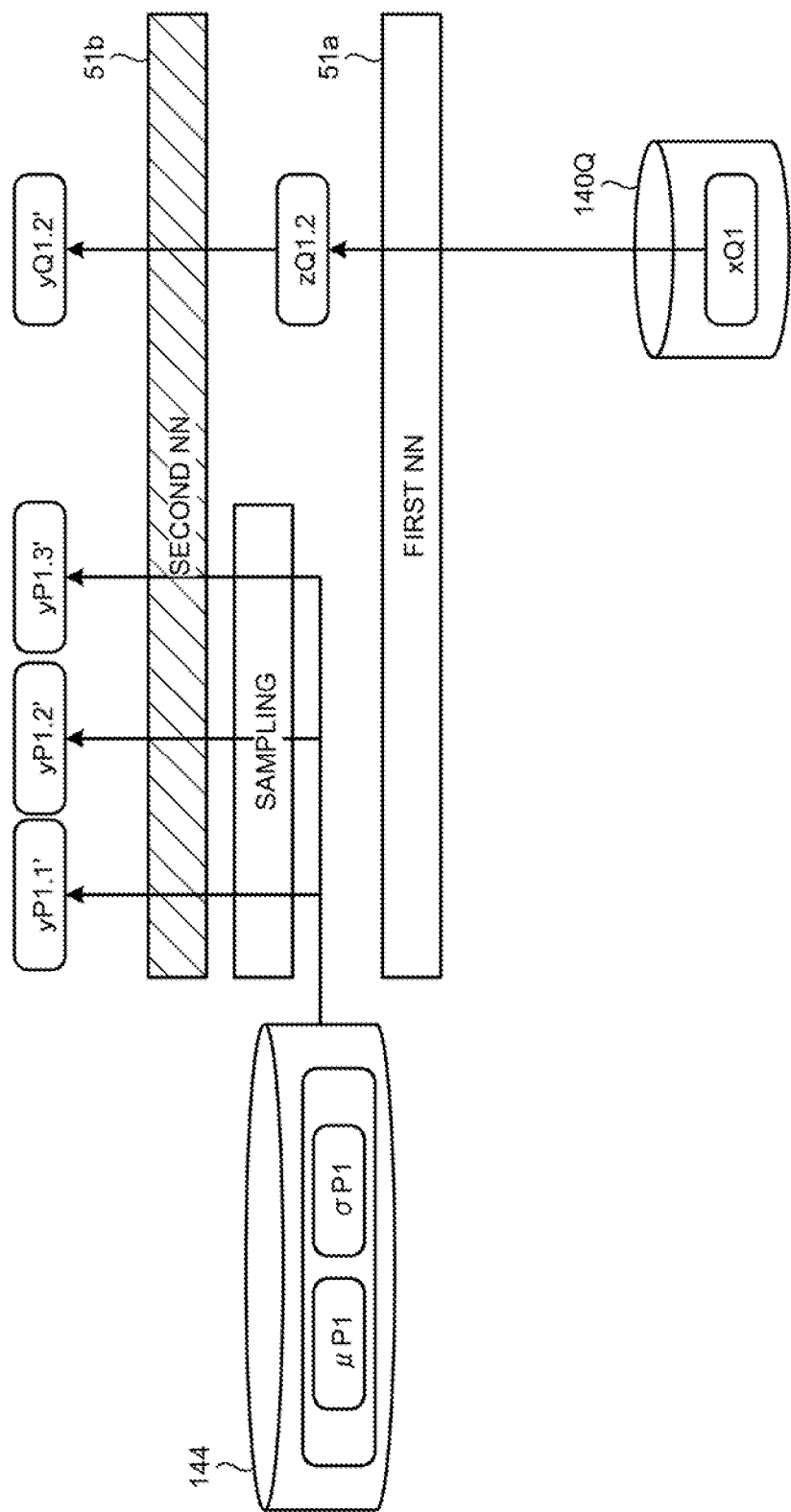
FIG. 15 is a diagram (2) for explaining an example of the other operation (1) performed in the learning device.

FIGS. 14 and 15 are diagrams for explaining an example of the other operation (1) performed in the learning device. Firstly, the explanation is given with reference to FIG. 14. For example, the learning device 100 sets the reference feature quantity (average μP1, dispersion σP1) corresponding to the original training data xP1. A feature quantity generating unit 250c sequentially inputs the sets of training data xP1.1 to xP1.3, which are obtained by performing data augmentation with respect to the same training data xP1, and calculates the intermediate feature quantities zP1.1 to zP1.3 (not illustrated), respectively. Then, the learning device 100 calculates an average μP1.1 and a dispersion σP1.1 of the intermediate feature quantities zP1.1 to zP1.3. Moreover, based on the KL (Kullback-Leibler) divergence, the learning device 100 evaluates the distance between the probability distribution of the reference feature quantity (average μP1, dispersion σP1) and the probability distribution (average μP1.1, dispersion σP1.1).

The learning device 100 implements the backpropagation method and learns the parameters and the reference feature quantity (average μP1, dispersion σP1) of the first NN 50a in order to ensure that the distance between the probability distributions becomes shorter. Moreover, the learning device 100 implements the backpropagation method and learns the parameter of the first NN 50a and the parameter of the second NN 50b in order to ensure that the output labels yP1.1 to yP1.3, which are obtained as a result of inputting the intermediate feature quantities zP1.1. to zP1.3, respectively, to the second NN 50b, approach the correct label yP1.

That is, the learning device 100 learns the parameter θ1 of the first NN 50a, the parameter θ2 of the second NN 50b, and the reference feature quantity (average μP1, dispersion σP1) in order to ensure that the degrees of similarity between the intermediate feature quantities and the reference quantity become higher, while lowering the errors between the out labels and the correct label. Then the learning device 100 stores the learnt reference feature quantity (average μP1, dispersion σP1) in the reference feature quantity database 144. Moreover, at the time of registering in the reference feature quantity database 144, the learning device 100 associates the reference feature quantity (average μP1, dispersion σP1) to the correct label yP1. Regarding each other set of original training data too, the learning device 100 learns the reference feature quantity in an identical manner, and registers it in the reference feature quantity database 144.

The following explanation is given with reference to FIG. 15. In the case of performing learning in the second round onward, the learning device 100 samples the distribution of the average μP1 and the dispersion σP1 stored in the reference feature quantity database 144; inputs the intermediate feature quantities, which are obtained as a result of sampling, to the second NN 51b; and calculates the output labels yP1.1' to yP1.3'. Then, the earning device 100 learns the parameter θ2 of the second NN 51b in order to ensure that the output labels yP1' to yP1.3' approach the correct label yP1 (not illustrated) stored in the reference feature quantity database 144. Meanwhile, the operation of learning the second NN 51b using the training data xQ1 stored in the database 140Q is identical to the first embodiment.

As described above with reference to FIGS. 14 and 15, by learning the reference feature quantity as a distribution, the desired number of intermediate feature quantities can be sampled and can be used during the earning in the second round onward.

The following explanation is given about the other operation (2) performed in the learning device 100. The learning device 100 performs data augmentation with respect to the original training data only during the first round of learning, and learns the deep learning model. However, that is not the only possible case. Alternatively during the learning in the second round onward too, the learning device 100 can perform learning by performing data augmentation with respect to the original training data.

Figure 16:
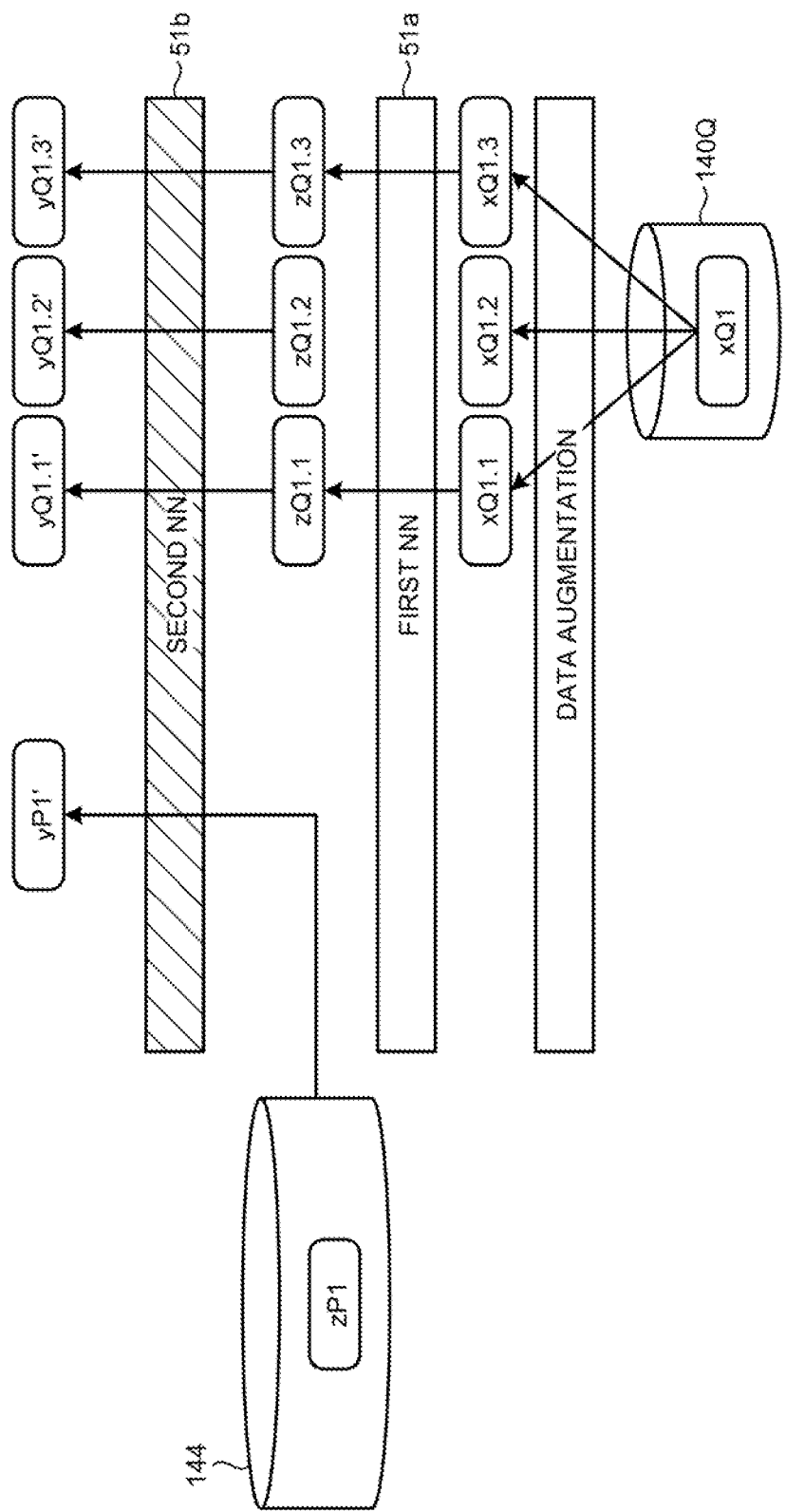
FIG. 16 is a diagram: for explaining another operation (2) performed in the learning device.

FIG. 16 is a diagram for explaining the other operation (2) performed in the learning device. As illustrated in FIG. 16, the learning device 100 performs data augmentation with respect to the training data xQ1 of the customer Q as stored in the database 140Q, and generates the sets of training data xQ1.1, xQ1.2, and xQ1.3. Then, the learning device 100 inputs the sets of training data xQ1.1, xQ1.2, and xQ1.3 to the first NN 51a, and calculates the intermediate feature quantities zQ1.1, zQ1.2, and zQ1.3, respectively.

The learning device 100 inputs the intermediate feature quantities zQ1.1, zQ1.2, and zQ1.3 to the second NN 51b; and calculates the output labels yQ1.1', yQ1.2', and yQ1.3', respectively. Then, the learning device 100 learns the parameter θ2 of the second NN 51b in order to ensure that the output labels yQ1.1', yQ1.2', and yQ1.3' approach the correct label yQ1 (not illustrated) of the training data xQ1.

Moreover, the learning device 100 inputs the reference feature quantity zP1, which is stored in the reference feature quantity database 144, to the second NN 51b; and calculates the output label yP1'. Then, the learning device 100 learns the parameter θ2 of the second NN 51b in order to ensure that the output label yP1' approaches the correct label yP1.

In this way, in the operations performed in the second round onward too, the learning device can perform data augmentation and increase the volume of data.

Figure 17:
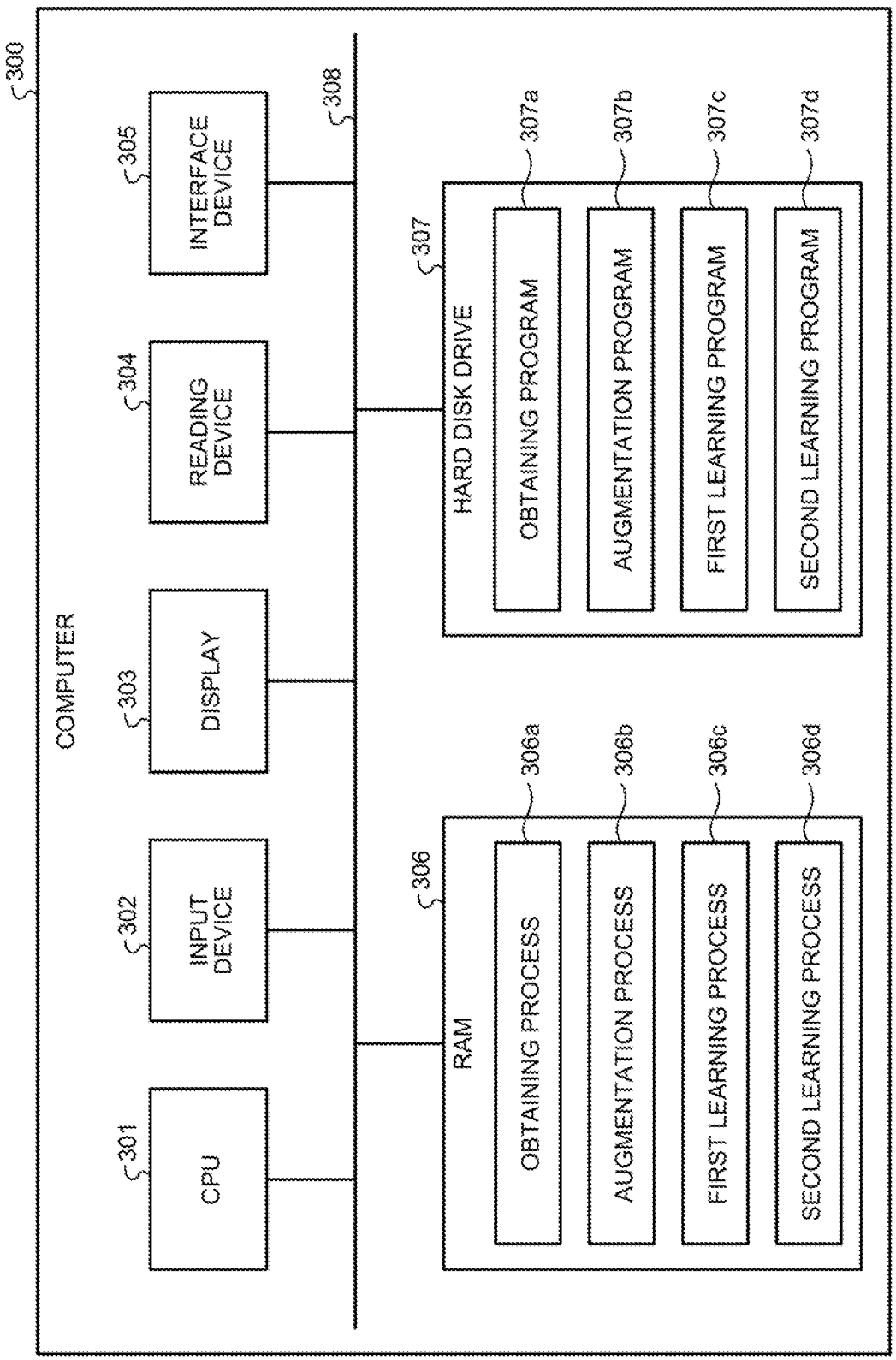
FIG. 17 is a diagram illustrating an exemplary hardware configuration of a computer that implements the functions identical to the learning device according to embodiments.
Figure 18:
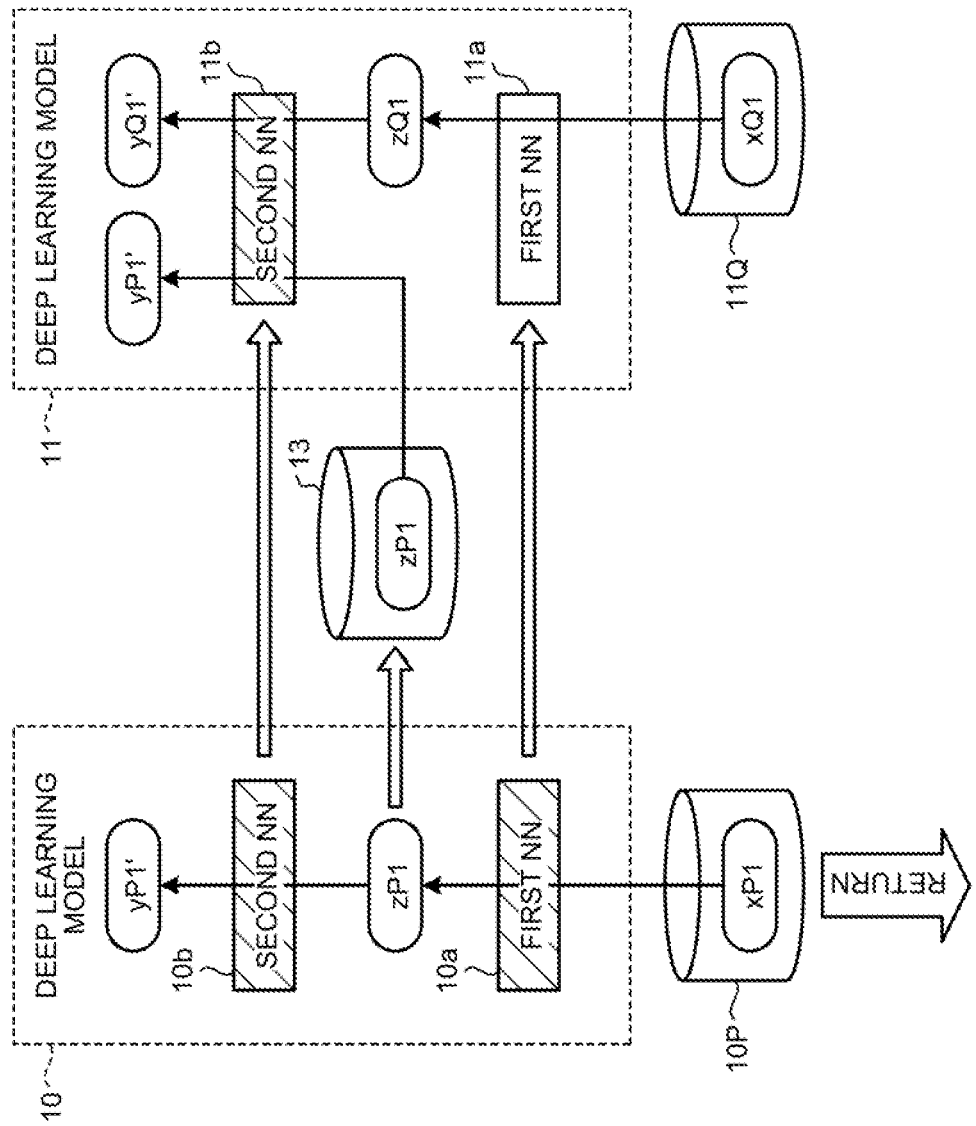
FIG. 18 is a diagram for explaining the conventional technology.
Figure 19:
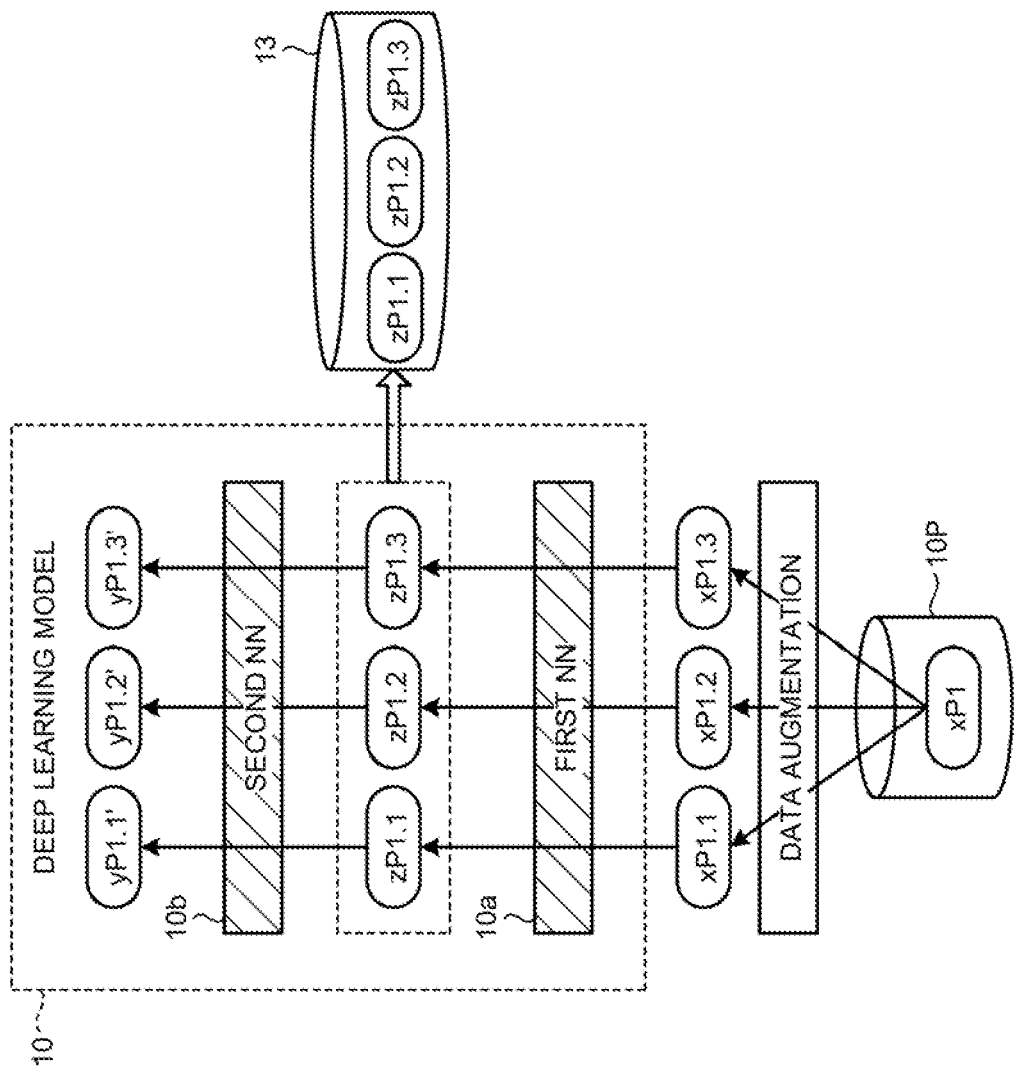
FIG. 19 is a diagram (1) for explaining the issues faced in the conventional technology.
Figure 20:
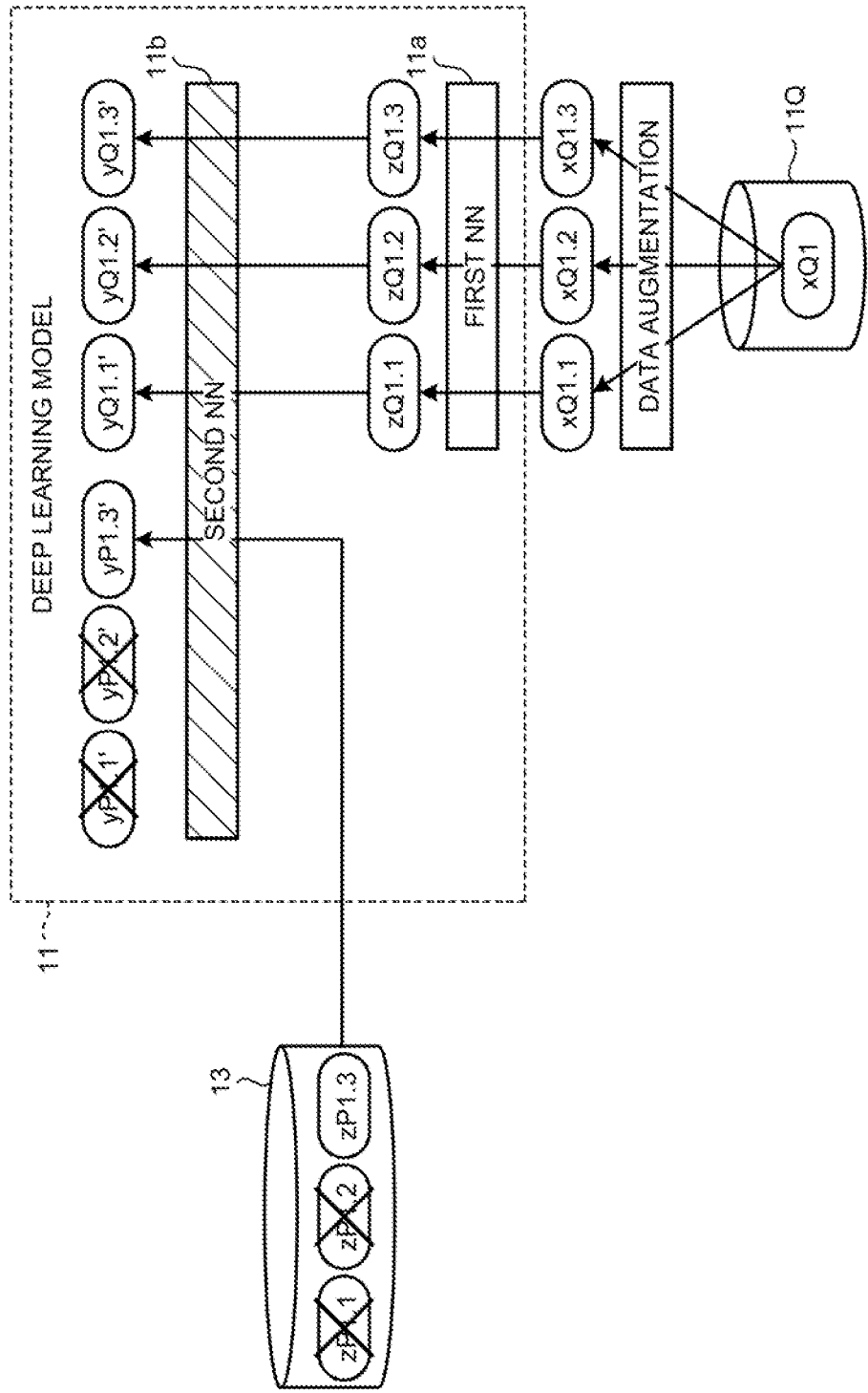
FIG. 20 is a diagram (2) for explaining the issues faced in the conventional technology.

Given below is the explanation of an exemplary hardware configuration of a computer that implements the functions identical to the learning device 100 according to the embodiments. FIG. 17 is a diagram illustrating an exemplary hardware configuration of a computer that implements the functions identical to the learning device 100 according to the embodiments.

As illustrated in FIG. 17, a computer 300 includes a CPU 301 that performs a variety of arithmetic processing, an input device 302 that receives input of data from the user, and a display 303. Moreover, the computer 300 includes a reading device 304 that reads computer programs from a memory medium, and an interface device 305 that performs data communication with external devices via a wired network or a wireless network. Furthermore, the computer 300 includes a RAM 306 that is used to temporarily store a variety of information, and a hard disk drive 307. Meanwhile, the devices 301 to 307 are connected to a bus 308.

The hard disk drive 307 has an obtaining program 307a, an augmentation program 307b, a first learning program 307c, and a second learning program 307d stored therein. The CPU 301 reads the obtaining program 307a, the augmentation program 307b, the first learning program 307c, and the second learning program 307d; and loads them in the RAM 306.

The obtaining program 307a functions as an obtaining process 306a. The augmentation program 307b functions as an augmentation process 306b. The first learning program 307c functions as a first learning process 306c. The second learning program 307d functions as a second learning process 306d.

The operations performed by the obtaining process 306a correspond to the operations performed by the obtaining unit 150a. The operations performed by the augmentation process 306b correspond to the operations performed by the augmentation unit 150b. The operations performed by the first learning process correspond to the operations performed by the first learning unit 150c. The operations performed by the second learning process 306d correspond to the operations performed by the second learning unit 150d.

Meanwhile, the computer programs 307a to 307d need not be always stored in the hard disk drive 307 from the beginning. Alternatively, for example, the computer programs 307a to 307d are stored in a "portable physical medium" such as a flexible disk (FD), a compact disk read only memory (CD-ROM), a digital versatile disk (DVD), a magneto optical disk, or an IC card that is inserted in the computer 300. Then, the computer 300 can read the computer programs 307a to 307d and execute them.

In regard to the illustrative embodiments including the embodiments described above, following Notes are further disclosed.

It becomes possible to continually use the feature quantities of the data-augmented training data, and to enable achieving enhancement in the learning accuracy of the deep learning model.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A learning method, executed by a computer, the learning method comprising:
   generating pieces of augmentation training data by performing data augmentation on first original training data;
   inputting each of the pieces of augmentation training data to a first network of a learning model, the first network outputting intermediate feature quantities respectively corresponding thereto;
   inputting the output intermediate feature quantities to a second network of the learning model, the second network outputting output labels respectively corresponding thereto;
   performing a first learning of a parameter of the first network and a reference feature quantity such that each of the intermediate feature quantities becomes similar to the reference feature quantity, wherein the learned reference feature quantity is stored in a memory device, and
   a second learning of the parameter of the first network and a parameter of the second network such that each of the output labels becomes close to a correct label of the first original training data;
   inputting second original training data different from the first original training data to the first network that outputs an intermediate feature quantity corresponding thereto, the output intermediate feature quantity being then input to the second network that outputs a first output label corresponding thereto;
   inputting the reference feature quantity stored in the memory device to the second network that outputs a second output label corresponding thereto;
   performing a third learning of the parameter of the second network such that the first output label becomes close to a correct label of the second original training data, and
   a fourth learning of the parameter of the second network such that the second output label becomes close to the correct label of the first original training data.

2. The learning method according to claim 1, wherein the inputting second original training data includes inputting pieces of augmentation training data generated therefrom to the first network that outputs intermediate feature quantities, respectively corresponding thereto, the output intermediate feature quantities being then input to the second network that outputs first output labels respectively corresponding thereto, and
   the performing the third learning includes learning of the parameter of the second network such that each of the first output labels becomes close to the correct label of the second original training data.

3. The learning method according to claim 1, wherein performing the first learning includes learning the parameter of the first network and the reference feature quantity such that an average and a dispersion of the intermediate feature quantities become similar to an average and a dispersion of the reference feature quantity.

4. The learning method according to claim 1, wherein the reference feature quantity is stored with the correct label of the first original training data in a corresponding manner in the memory device.

5. A non-transitory computer readable storage medium having stored therein a program that causes a computer to execute a process including:
   generating pieces of augmentation training data by performing data augmentation on first original training data;
   inputting each of the pieces of augmentation training data to a first network of a learning model, the first network outputting intermediate feature quantities respectively corresponding thereto;
   inputting the output intermediate feature quantities to a second network of the learning model, the second network outputting output labels respectively corresponding thereto;
   performing a first learning of a parameter of the first network and a reference feature quantity such that each of the intermediate feature quantities becomes similar to the reference feature quantity, wherein the learned reference feature quantity is stored in a memory device, and
   a second learning of the parameter of the first network and a parameter of the second network such that each of the output labels becomes close to a correct label of the first original training data;
   inputting second original training data different from the first original training data to the first network that outputs an intermediate feature quantity corresponding thereto, the output intermediate feature quantity being then input to the second network that outputs a first output label corresponding thereto;
   inputting the reference feature quantity stored in the memory device to the second network that outputs a second output label corresponding thereto;
   performing a third learning of the parameter of the second network such that the first output label becomes close to a correct label of the second original training data, and
   a fourth learning of the parameter of the second network such that the second output label becomes close to the correct label of the first original training data.

6. The non-transitory computer readable storage medium according to claim 5, wherein the inputting second original training data includes inputting pieces of augmentation training data generated therefrom to the first network that outputs intermediate feature quantities, respectively corresponding thereto, the output intermediate feature quantities being then input to the second network that outputs first output labels respectively corresponding thereto, and
   the performing the third learning includes learning of the parameter of the second network such that each of the first output labels becomes close to the correct label of the second original training data.

7. The non-transitory computer readable storage medium according to claim 5, wherein the performing the first learning includes learning the parameter of the first network and the reference feature quantity such that an average and a dispersion of the intermediate feature quantities become similar to an average and a dispersion of the reference feature quantity.

8. The non-transitory computer readable storage medium according to claim 5, wherein the reference feature quantity is stored with the correct label of the first original training data in a corresponding manner in the memory device.

9. A learning device comprising:
a processor configured to:
generate pieces of augmentation training data by performing data augmentation on first original training data;
input each of the pieces of augmentation training data to a first network of a learning model, the first network outputting intermediate feature quantities respectively corresponding thereto;
input the output intermediate feature quantities to a second network of the learning model, the second network outputting output labels respectively corresponding thereto;
perform a first learning of a parameter of the first network and a reference feature quantity such that each of the intermediate feature quantities becomes similar to the reference feature quantity, wherein the learned reference feature quantity is stored in a memory device, and
a second learning of the parameter of the first network and a parameter of the second network such that each of the output labels becomes close to a correct label of the first original training data;
input second original training data different from the first original training data to the first network that outputs an intermediate feature quantity corresponding thereto, the output intermediate feature quantity being then input to the second network that outputs a first output label corresponding thereto;
input the reference feature quantity stored in the memory device to the second network that outputs a second output label corresponding thereto;
perform a third learning of the parameter of the second network such that the first output label becomes close to a correct label of the second original training data, and
a fourth learning of the parameter of the second network such that the second output label becomes close to the correct label of the first original training data.

10. The learning device according to claim 9, wherein the inputting second original training data includes inputting pieces of augmentation training data generated therefrom to the first network that outputs intermediate feature quantities, respectively corresponding thereto, the output intermediate feature quantities being then input to the second network that outputs first output labels respectively corresponding thereto, and
the performing the third learning includes learning of the parameter of the second network such that each of the first output labels becomes close to the correct label of the second original training data.

11. The learning device according to claim 9, wherein the performing the first learning includes learning the parameter of the first network and the reference feature quantity such that an average and a dispersion of the intermediate feature quantities become similar to an average and a dispersion of the reference feature quantity.

12. The learning device according to claim 9, wherein the reference feature quantity is stored with the correct label of the first original training data in a corresponding manner in the memory device.

* * * * *